US012654656B2

(12) United States Patent
Takenaka et al.

(10) Patent No.: US 12,654,656 B2
(45) Date of Patent: Jun. 16, 2026

(54) INDUCTIVE SENSOR AND BRAKE PEDAL DEVICE

(71) Applicant: DENSO CORPORATION, Kariya-city (JP)

(72) Inventors: Kenichiro Takenaka, Kariya-city (JP); Yuki Matsunaga, Kariya-city (JP); Etsugo Yanagida, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/904,909

(22) Filed: Oct. 2, 2024

(65) Prior Publication Data

US 2025/0026320 A1     Jan. 23, 2025

Related U.S. Application Data

(63) Continuation of application No. PCT/JP2023/016860, filed on Apr. 28, 2023.

(30) Foreign Application Priority Data

Dec. 7, 2022     (WO) .................. PCT/JP2022/045140

(51) Int. Cl.
B60T 7/04 (2006.01)
(52) U.S. Cl.
CPC .................................... B60T 7/042 (2013.01)
(58) Field of Classification Search
CPC ....... B60T 7/042; B60T 2270/82; G01D 5/20; G01D 5/2053; G01D 5/22; G01D 5/225; G01D 5/2258
See application file for complete search history.

(56) References Cited

U.S. PATENT DOCUMENTS 6,384,598 B1 * 5/2002 Hobein ................ G01D 5/2046
                                                      318/660
10,837,848 B2 * 11/2020 Janisch ................ G01D 5/2053
(Continued)

FOREIGN PATENT DOCUMENTS

EP          1117024 A2 * 7/2001  .............. G05G 5/03
JP       2007102393 A      4/2007
(Continued)

OTHER PUBLICATIONS

U.S. Appl. No. 18/904,851 to Matsunaga, filed Oct. 2, 2024 (154 pages).

*Primary Examiner* — Thomas C Diaz
(74) *Attorney, Agent, or Firm* — Nixon & Vanderhye P.C.

(57) ABSTRACT

An inductive sensor detects a position of a detection object relative to a fixed body, in which the detection object is either provided as (i) a rotating body rotatable about a predetermined axis relative to the fixed body or (ii) a movable body movable in accordance with movement of the rotating body. The inductive sensor includes a circuit board and multiple targets. The circuit board has, implemented thereon, a transceiver coil including a transmitter coil and a receiver coil, and a transceiver circuit that supplies a high frequency wave to the transmitter coil and outputs a signal corresponding to a change in inductance of the receiver coil, and is fixed to the fixed body. The multiple target objects are configured to move in synchronization with movement of the detection object and to include a conductor.

19 Claims, 38 Drawing Sheets

(56) References Cited

U.S. PATENT DOCUMENTS

| | | | | |
|---|---|---|---|---|
| 11,614,765 B2 * | 3/2023 | Miller | ...................... | G01D 3/08 |
| | | | | 74/514 |
| 2017/0021725 A1 | 1/2017 | Heipel et al. | | |
| 2019/0310148 A1 * | 10/2019 | Bertin | ..................... | G01L 3/105 |
| 2021/0310834 A1 | 10/2021 | Coyne et al. | | |
| 2022/0348172 A1 | 11/2022 | Yanagida et al. | | |
| 2022/0381549 A1 | 12/2022 | Coyne et al. | | |

FOREIGN PATENT DOCUMENTS

| | | | |
|---|---|---|---|
| JP | 2017531187 A | 10/2017 |
| JP | 2019060739 A | 4/2019 |

* cited by examiner

INDUCTIVE SENSOR AND BRAKE PEDAL DEVICE

CROSS REFERENCE TO RELATED APPLICATIONS

The present application is a continuation application of International Patent Application No. PCT/JP2023/016860 filed on Apr. 28, 2023, which designated the U.S. and claims the benefit of priority from Japanese Patent Application No. 2022-075558 filed on Apr. 29, 2022 and International Application No. PCT/JP2022/045140 filed on Dec. 7, 2022. The entire disclosures of all of the above applications are incorporated herein by reference.

TECHNICAL FIELD

The present disclosure relates to an inductive sensor and a brake pedal device including the same.

BACKGROUND INFORMATION

Conventionally, inductive sensors are known as non-contact sensors that detect a position of a detection object such as a pedal arm provided in a brake pedal device.

SUMMARY

According to one aspect of the present disclosure, an inductive sensor is configured to detect a position of a detection object relative to a fixed body, and the detection object is either (i) a rotating body rotatably provided about a predetermined axis relative to the fixed body or (ii) a movable body moving in accordance with a movement of the rotating body. The inductive sensor includes a circuit board and multiple targets. The circuit board fixed to the fixed body is implemented with a transceiver coil including a transmitter coil and a receiver coil, and a transceiver circuit that supplies a high frequency wave to the transmitter coil and outputs a signal corresponding to a change in inductance of the receiver coil. The multiple targets are configured to include a conductor and to move in synchronization with a movement of the detection object.

According to an another aspect of the present disclosure, a brake pedal device is used in a brake-by-wire system in which a brake mechanism brakes a vehicle under drive control of an electronic control device mounted on the vehicle. The brake pedal device includes an inductive sensor according to the one aspect, a housing as a fixed body, a shaft as a rotating body, a brake pedal as a movable body, and a reaction force generating mechanism. The housing is fixed directly or indirectly to a vehicle body. The shaft is rotatable within a predetermined angular range relative to the housing. The brake pedal is fixed to the shaft and moves within a predetermined angular range about an axis of the shaft. The reaction force generating mechanism generates a reaction force against a pedaling force of a driver applied to the brake pedal.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
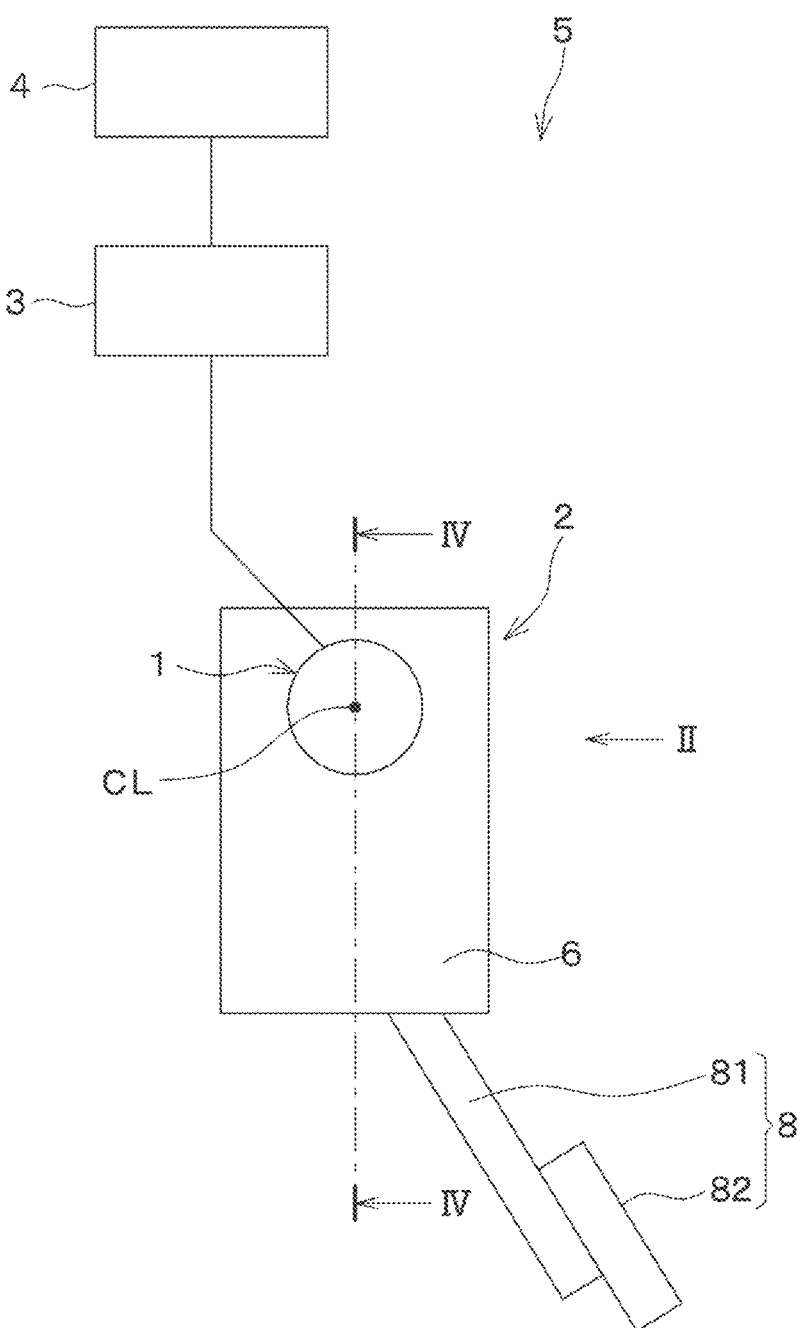
FIG. 1 is a schematic configuration diagram of a brake-by-wire system including a side view of a brake pedal device having an inductive sensor according to a first embodiment.
Figure 2:
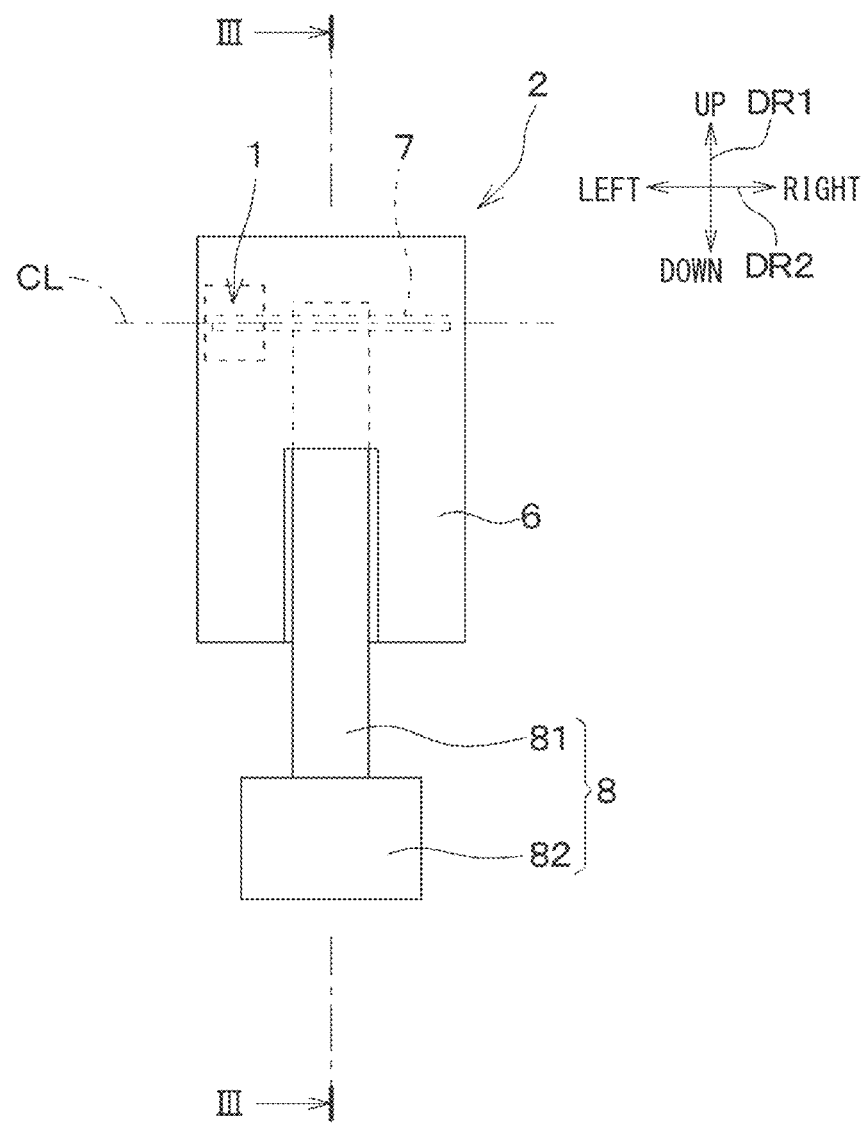
FIG. 2 is a plan view of the brake pedal device taken along an arrow II in FIG. 1.
Figure 3:
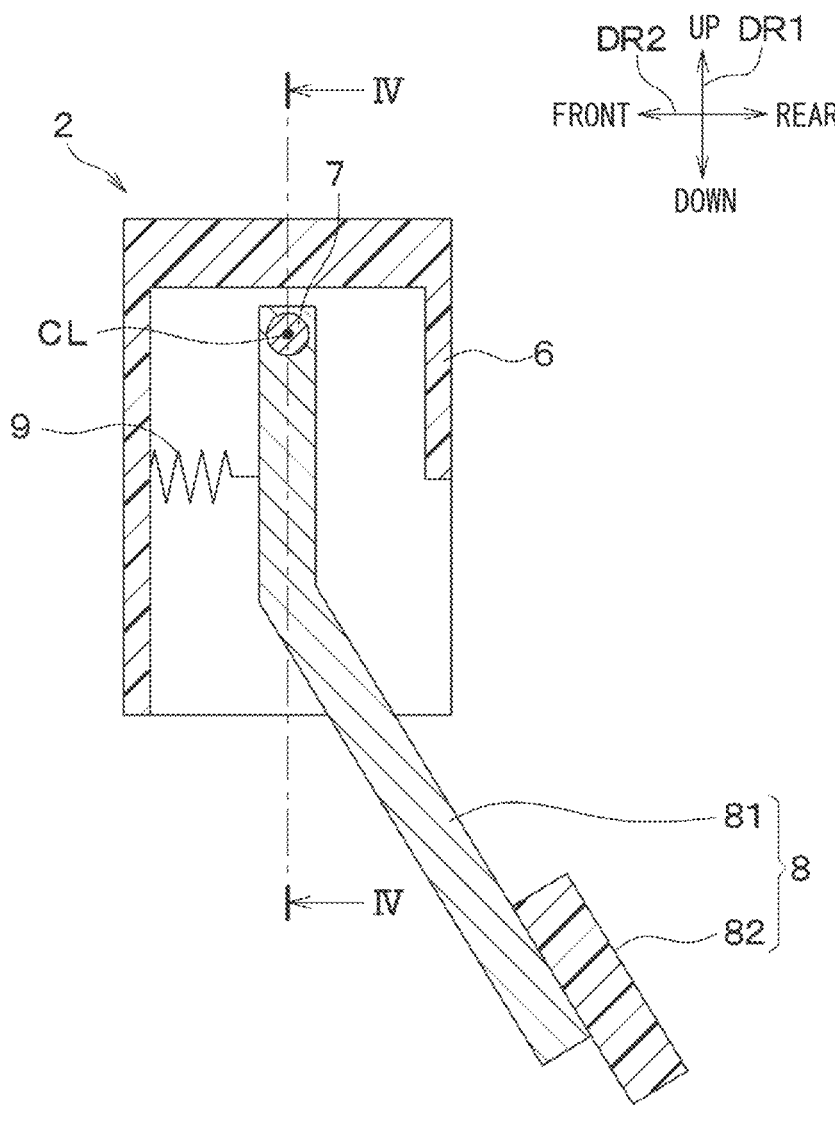
FIG. 3 is a cross-sectional view taken along a line III-III of FIG. 2.

Conventionally, inductive sensors are known as non-contact sensors that detect a position of a detection object such as a pedal arm provided in a brake pedal device. The above-mentioned inductive sensor includes a coupler having a target metal, and a plurality of circuit boards on which coil patterns and the like are implemented and which are arranged to face the target metal. The above-mentioned inductive sensor outputs signals corresponding to the position of the pedal arm from the plurality of circuit boards in accordance with a movement of the coupler with the target metal on a coil pattern, which is in synchronization with the movement of the pedal arm.

However, the above inductive sensor is configured to include only one coupler. Therefore, if the coupler falls off for some reason, such as a pin securing the coupler coming loose, or if the coupler is deformed, there is a risk that the inductive sensor simultaneously outputs erroneous values from the plurality of circuit boards, or that the inductive sensor does not simultaneously output values from multiple boards.

In view of the above, it is an object of the present disclosure to provide an inductive sensor capable of ensuring redundancy in detecting the position of a detection object. Another object of the present disclosure is to provide a brake pedal device equipped with an inductive sensor.

According to one aspect of the present disclosure, an inductive sensor is configured to detect a position of a detection object relative to a fixed body, and the detection object is either (i) a rotating body rotatably provided about a predetermined axis relative to the fixed body or (ii) a movable body moving in accordance with a movement of the rotating body. The inductive sensor includes a circuit board and multiple targets. The circuit board fixed to the fixed body is implemented with a transceiver coil including a transmitter coil and a receiver coil, and a transceiver circuit that supplies a high frequency wave to the transmitter coil and outputs a signal corresponding to a change in inductance of the receiver coil. The multiple targets are configured to include a conductor and to move in synchronization with a movement of the detection object.

According to the above, even if one of the multiple targets falls off or is deformed, the position of the detection object is correctly detectable by using another target and the transceiver coil. Therefore, the inductive sensor can ensure redundancy in detecting the position of the detection object even if the target falls off or is deformed.

According to an another aspect of the present disclosure, a brake pedal device is used in a brake-by-wire system in which a brake mechanism brakes a vehicle under drive control of an electronic control device mounted on the vehicle. The brake pedal device includes an inductive sensor according to the one aspect, a housing as a fixed body, a shaft as a rotating body, a brake pedal as a movable body, and a reaction force generating mechanism. The housing is fixed directly or indirectly to a vehicle body. The shaft is rotatable within a predetermined angular range relative to the housing. The brake pedal is fixed to the shaft and moves within a predetermined angular range about an axis of the shaft. The reaction force generating mechanism generates a reaction force against a pedaling force of a driver applied to the brake pedal.

In a brake-by-wire system, if the shaft and the inductive sensor that detects the position of the brake pedal in the brake pedal device suffer from loss of functions, there is a risk that braking of the vehicle will be hindered. In contrast, according to the another aspect of the present disclosure, the inductive sensor is provided with multiple targets, it is possible to ensure redundancy in detecting the position of the shaft and the brake pedal even if the target falls off or is deformed. Therefore, the brake pedal device can improve the safety of vehicle braking using the brake-by-wire system.

Embodiments of the present disclosure will now be described with reference to the drawings. Parts that are identical or equivalent to each other in the following embodiments are assigned with the same reference numerals and will not be described.

First Embodiment

A first embodiment will be described with reference to the drawings. As shown in FIG. 1, an inductive sensor 1 of the first embodiment is applied to a brake pedal device 2 mounted on a vehicle. The brake pedal device 2 is used in a brake-by-wire system 5 in which a brake mechanism 4 brakes the vehicle under a drive control of an electronic control unit (hereinafter referred to as "ECU 3") mounted on the vehicle. ECU is an abbreviation for electronic control unit. In particular, the brake pedal device 2 to which the inductive sensor 1 of the first embodiment is applied is used in a complete brake-by-wire system 5. A "complete" brake-by-wire system 5 is a system in which components of the brake mechanism 4 are not mechanically connected to a brake pedal, and the ECU 3 drives and controls the brake mechanism 4 based on an output signal of the inductive sensor 1 to brake the vehicle. One of the components of the brake mechanism 4 is, for example, a master cylinder.

First, a schematic configuration of the brake pedal device 2 and the brake-by-wire system 5 will be described. As shown in FIGS. 1 to 4, the brake pedal device 2 includes a housing 6, a shaft 7, a brake pedal 8, a reaction force generating mechanism 9, the inductive sensor 1, and the like.

The housing 6 is directly fixed to a vehicle body by bolts or the like (not shown), or is indirectly fixed to the vehicle body via a base member or the like (not shown). Specifically, the housing 6 is fixed to a dash panel or a floor inside a vehicle compartment. The housing 6 corresponds to an example of a fixed body. Inside the housing 6, bearings 61 and 62 are provided for rotatably supporting the shaft 7.

The shaft 7 is formed in a rod shape, and is supported by the bearings 61 and 62 provided in the housing 6. The shaft 7 is rotatable relative to the housing 6 within a predetermined angle range in a circumferential direction of a circle centered on its own axis CL (hereinafter referred to as "about the axis"). The shaft 7 corresponds to an example of a rotating body that is rotatable about a predetermined axis relative to the housing 6, which serves as a fixed body.

The brake pedal 8 has a pedal arm 81 and a pedal pad 82. The pedal arm 81 has one end fixed to the shaft 7 and has a pedal pad 82 provided at the other end. The pedal pad 82 is a portion that is stepped on by a foot of a driver. When the driver performs a pedaling operation on the brake pedal 8, the brake pedal 8 swings in forward and reverse directions within a predetermined angular range about the axis of the shaft 7. The brake pedal 8 corresponds to an example of a movable body that moves in accordance with the movement of the shaft 7 as a rotating body.

The reaction force generating mechanism 9 is composed of, for example, a spring, an actuator, and the like. The reaction force generating mechanism 9 is a mechanism that generates a reaction force against a pedaling force of a driver applied to the brake pedal 8. By providing the reaction force generating mechanism 9, the brake pedal device 2 obtains a reaction force similar to that obtained when the brake pedal 8 is connected to a master cylinder (i.e., when a reaction force is obtainable by hydraulic pressure) even if the mechanical connection between the brake pedal 8 and a conventional master cylinder is eliminated.

The inductive sensor 1 detects a position (specifically, a rotation angle) of a detection object, which is the shaft 7 as a rotating body or the brake pedal 8 as a movable body, relative to the housing 6 as a fixed body. An electric signal output from the inductive sensor 1 is transmitted to the ECU 3.

The ECU 3 is composed of a microcomputer including a processor that performs control processing and arithmetic processing, storage units such as ROM and RAM that store programs, data, and the like, and peripheral circuits thereof. The storage units include non-transitory, tangible storage media. The ECU 3 performs various control processing and arithmetic processing based on programs stored in the storage unit, and controls the operation of each device connected to an output port. Specifically, the ECU 3 detects an accurate pedal operation amount (i.e., an operation amount of the brake pedal 8) based on an electric signal transmitted from the inductive sensor 1 and the like, and controls the operation of the brake mechanism 4. The number of ECUs 3 is not limited to one, and the driving of the brake mechanism 4 may be controlled by multiple ECUs 3.

Various mechanisms can be employed as the brake mechanism 4. For example, the brake mechanism 4 may be an electric brake that brakes each wheel by driving an electric motor in response to an instruction from the ECU 3 and pressing a brake pad against a disc brake rotor. Alternatively, for example, the brake mechanism 4 may be configured to increase the hydraulic pressure of brake fluid by operating a master cylinder or a hydraulic pump, drive a wheel cylinder arranged on each wheel, and operate the brake pad. Further, the brake mechanism 4 is also capable of performing normal control, ABS control, VSC control, and the like in response to control signals from the ECU 3. ABS is an abbreviation for Anti-lock Braking System, and VSC is an abbreviation for Vehicle Stability Control.

Next, the inductive sensor 1 will be described. The inductive sensor 1 is a sensor that utilizes the principle of mutual induction. In detail, when a target having a conductor approaches the transmitter coil, the magnetic field of the transmitter coil is canceled and the amount of magnetic flux passing through the receiver coil changes, and the inductive sensor 1 reads this change as an output. The output corresponds to a detection value that corresponds to an angular position of the detection object about the axis. The transmitter coil is also called as an excitation coil.

Figure 4:
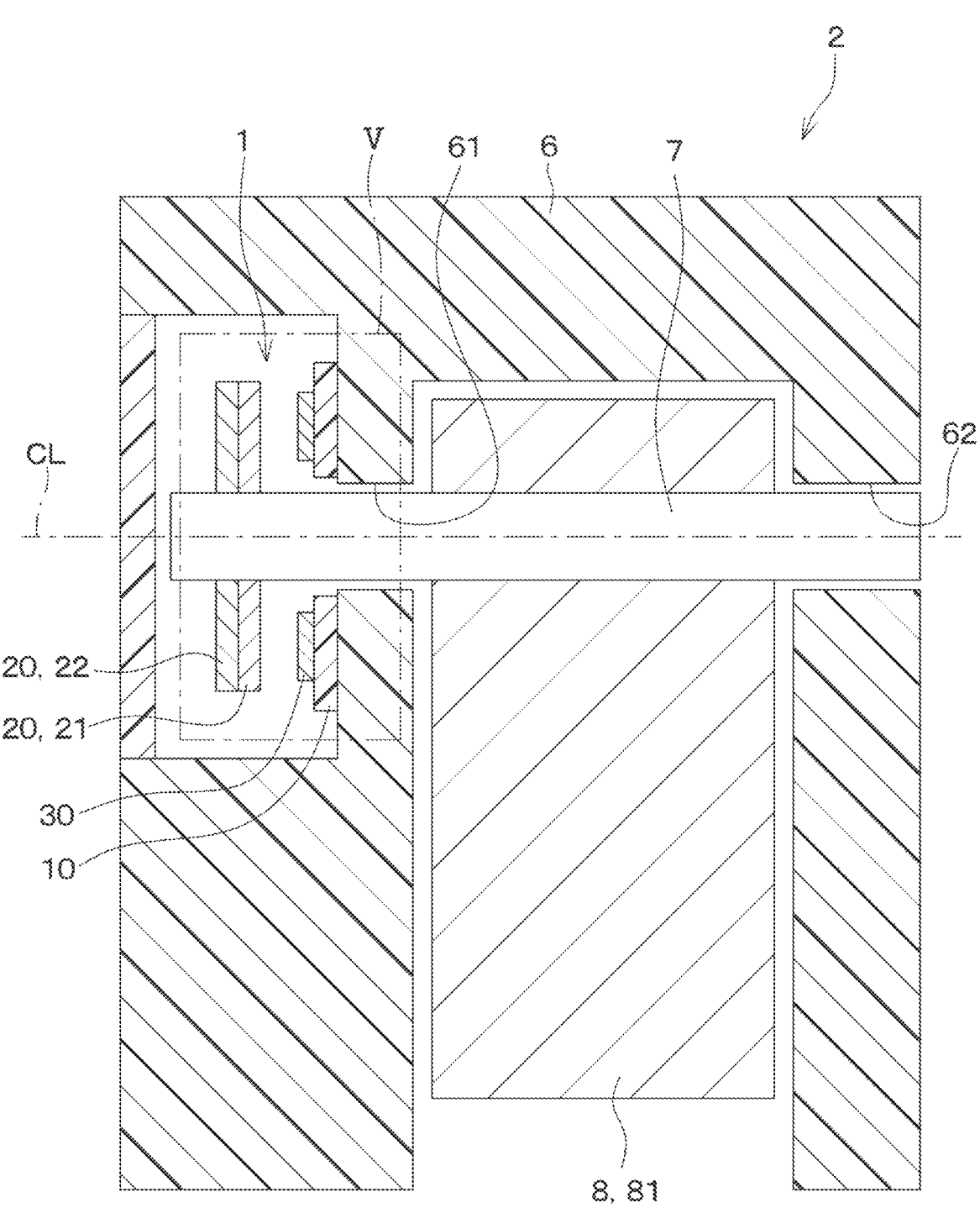
FIG. 4 is a cross-sectional view taken along a line IV-IV in FIGS. 1 and 3.
Figure 5:
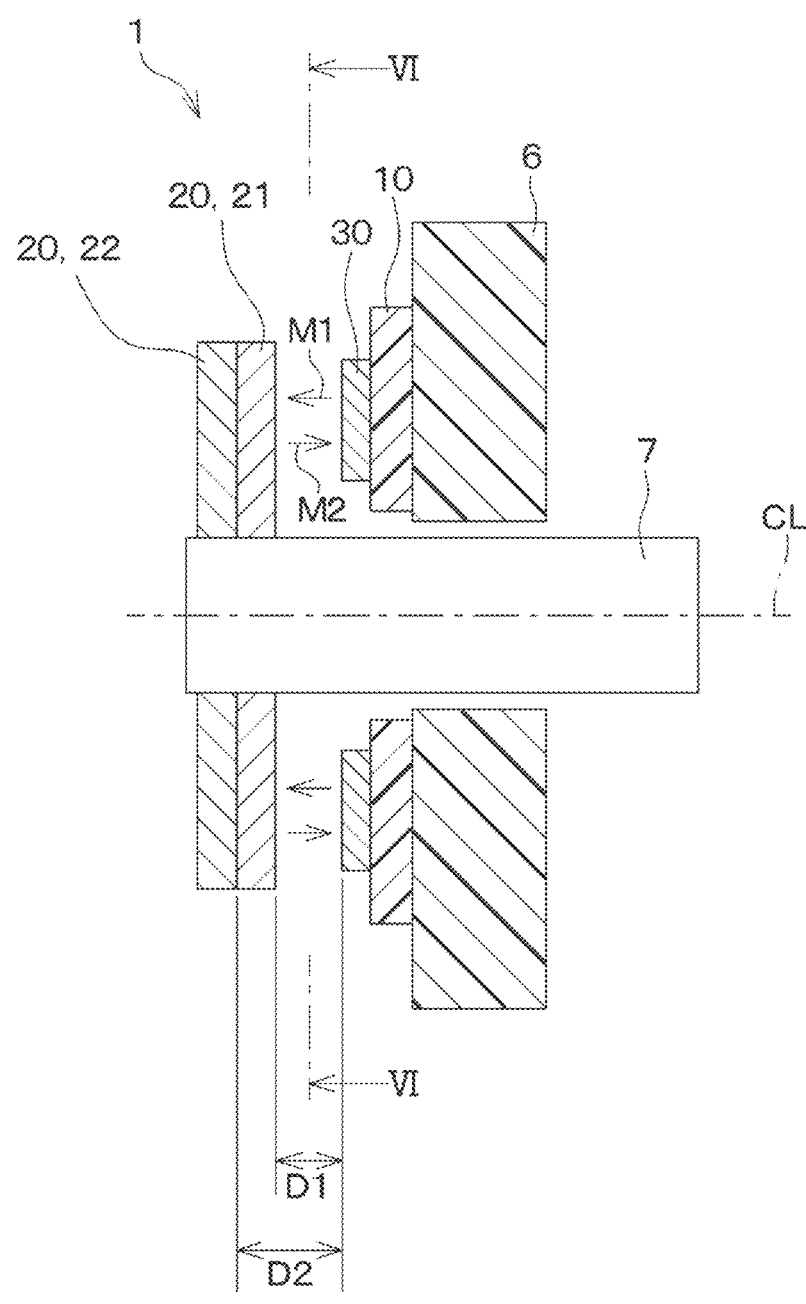
FIG. 5 is an enlarged view of a portion V in FIG. 4, and is a cross-sectional view parallel to an axis of a shaft in the inductive sensor according to the first embodiment.
Figures 6, 7:
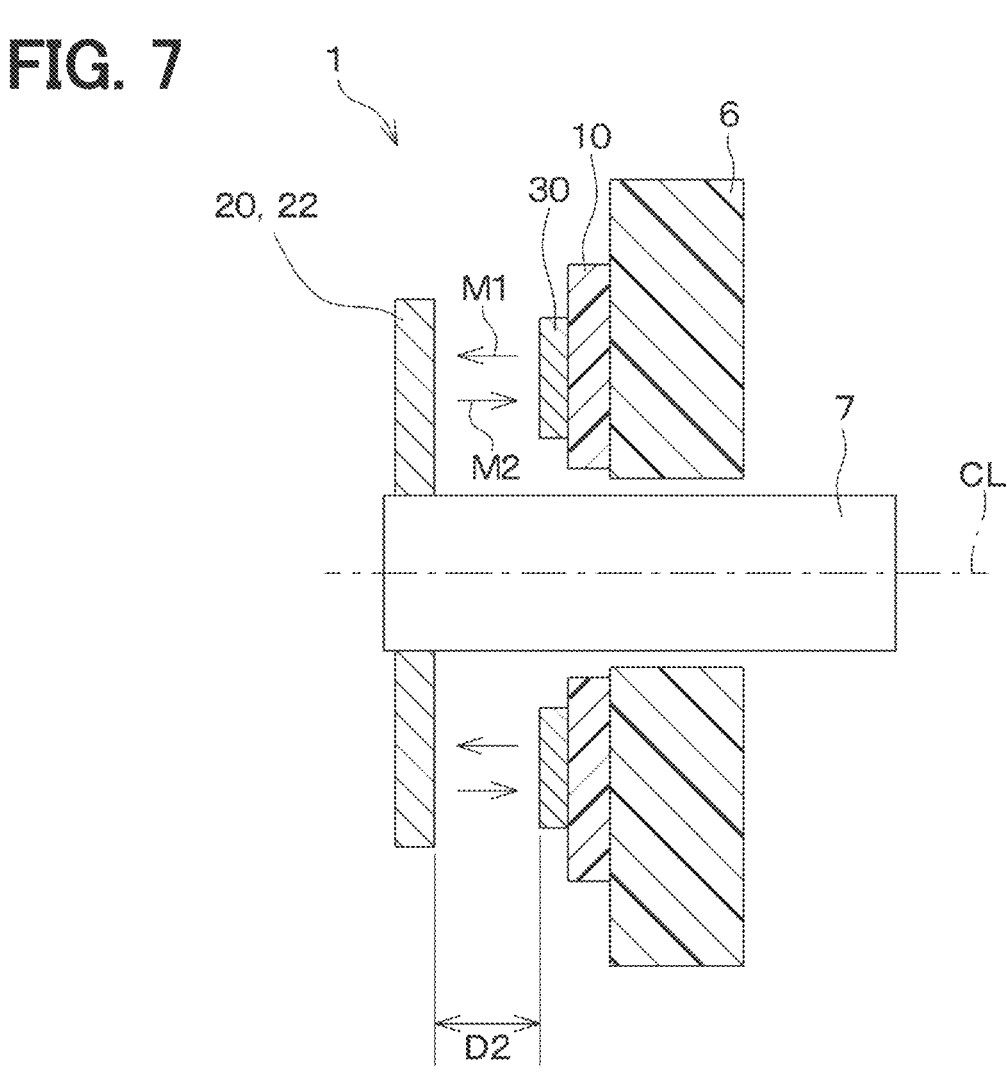
FIG. 6 is a cross-sectional view taken along a line VI-VI in FIG. 5.
FIG. 7 is a diagram showing a state in which a first target has fallen off in the inductive sensor according to the first embodiment.

As shown in FIGS. 4 to 6, the inductive sensor 1 of the present embodiment includes a circuit board 10 and multiple targets 20.

The circuit board 10 is fixed to the housing 6 which serves as a fixed body. A transmitter coil (not shown), a receiver coil (not shown), and a transceiver circuit (i.e., sending and receiving circuit) are implemented on the circuit board 10. In the following description, the transmitter coil and the receiver coil are collectively referred to as a "transceiver coil 30." FIG. 4 shows an area on the circuit board 10 where the transceiver coil 30 is implemented. The transceiver circuit is formed of an integrated circuit (IC) such as an ASIC. The transceiver circuit supplies a high frequency wave to the transmitter coil, and outputs a signal according to the change in inductance of the receiver coil.

The multiple targets 20 include a first target 21 and a second target 22. In addition, in the first embodiment and the like, from among the multiple targets 20, a target 20 arranged on a circuit board 10 side is called as the first target 21, and a target 20 arranged on an opposite side of the circuit board 10 relative to the first target 21 is called as the second target 22. It should be noted that the inductive sensor 1 is not limited to have two targets 20 (i.e., the first target 21 and the second target 22), and may have three or more targets 20. Such a configuration also applies to each of the embodiments described later.

Each of the multiple targets 20 includes a conductor. The multiple targets 20 may be entirely made of a conductor, or may only partially contain a conductor. The multiple targets 20 are fixed to the shaft 7 as a detection object. Therefore, the multiple targets 20 move in synchronization with the shaft 7. The method of fixing the target 20 to the shaft 7 can be, for example, one or more of press fitting, snap fitting, caulking, and welding. In addition, the multiple targets 20 may each be fixed independently to the detection object, or, as described in the eleventh embodiment described below, the multiple targets 20 may be fixed to the detection object by the same fixing member. Such a configuration also applies to each of the embodiments described later.

As shown in FIG. 6, the first target 21 has a cylinder portion 211 that surrounds an outer wall of the shaft 7 on a radial outside, and multiple blades 212 that extend radially outward from the cylinder portion 211. In the present embodiment, the first target 21 has four blades 212. The second target 22 also has a cylinder portion 221 surrounding the outer wall of the shaft 7 on the radial outside, and multiple blades 222 extending radially outward from the cylinder portion 221. The second target 22 also has four blades 222. The four blades 212, 222 of the first target 21 and the second target 22, respectively, are provided at predetermined intervals in a circumferential direction of the cylinder portions 211, 221 in an area around the entire circumference. By providing the four blades 212, 222 in an area around the entire circumference of the cylinder portions 211, 221 in the circumferential direction, it is possible to increase the output of the inductive sensor 1.

As shown in FIG. 5, the first target 21 and the second target 22 are arranged to overlap in a plate thickness direction. A distance (i.e., detection gap) D1 between the first target 21 and the transceiver coil 30 is set to a distance at which mutual induction occurs. Further, a distance (i.e., detection gap) D2 between the second target 22 and the transceiver coil 30 is also set to a distance at which mutual induction occurs. In FIG. 5, the occurrence of mutual induction in the detection gap between the target 20 and the transceiver coil 30 is shown diagrammatically by arrows M1 and M2.

When viewed from a direction in which the axis CL of the shaft 7 extends (hereinafter referred to as an "axial direction"), the shape of the first target 21 and the shape of the second target 22 may or may not overlap. FIG. 6 shows a state in which the shape of the first target 21 and the shape of the second target 22 are arranged with a slight deviation about the axis when viewed from the axial direction (i.e., targets 21 and 22 do not overlap at least partially).

Incidentally, the brake pedal device 2 mounted on a vehicle may be subjected to vibrations from the vehicle while the vehicle is traveling. Furthermore, the brake pedal device 2 may be used in high or low temperature and high humidity environments. Therefore, there is a risk that the target 20 attached to the brake pedal device 2 may fall off due to some cause (for example, vehicle vibration, loss of fixing force due to rust, and the like).

FIG. 7 shows a state in which the first target 21 has fallen off the shaft 7 for some reason in the inductive sensor 1 of the first embodiment. As shown in FIG. 7, the inductive sensor 1 of the first embodiment can detect the positions of the shaft 7 and the brake pedal 8 by using the second target 22 even when the first target 21 has fallen off.

Figure 8:
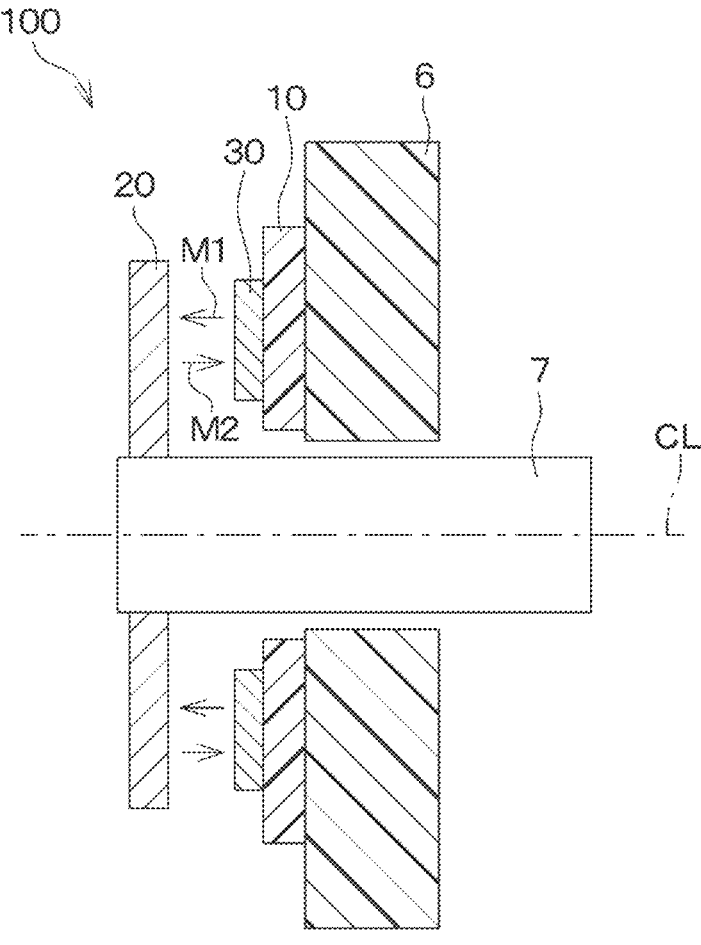
FIG. 8 is a cross-sectional view parallel to the axis of the shaft in the inductive sensor of a first comparative example.

Here, for comparison with the inductive sensor 1 of the first embodiment, an inductive sensor 100 of a first comparative example will be described. As shown in FIG. 8, the inductive sensor 100 of the first comparative example includes one target 20 and a circuit board 10 on which a transceiver coil 30 and the like are implemented.

Figure 9:
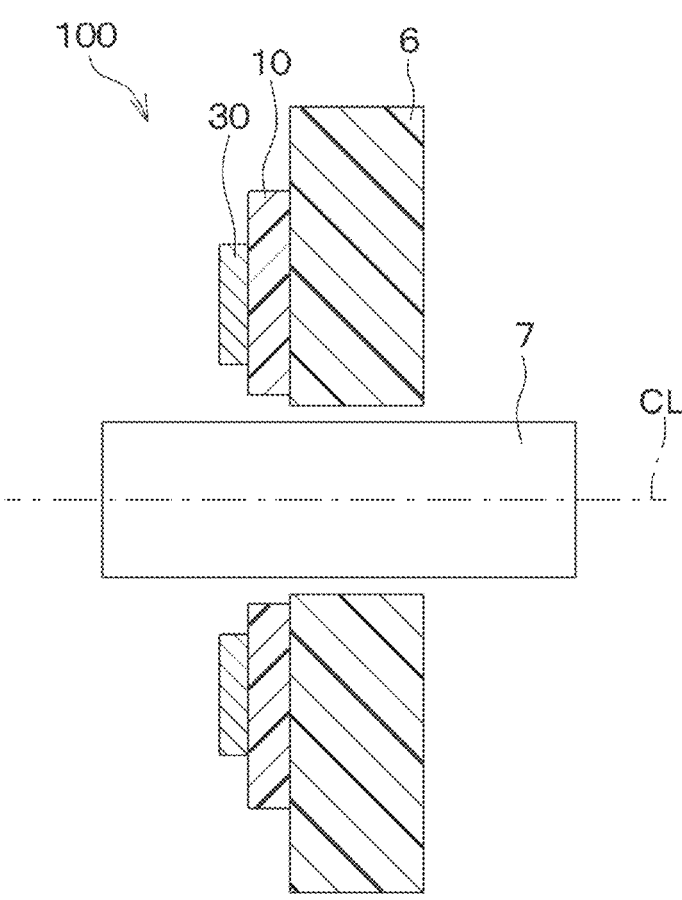
FIG. 9 is a diagram showing a state in which a target has fallen off in the inductive sensor of the first comparative example.

FIG. 9 shows a state in which the target 20 has fallen off the shaft 7 for some reason in the inductive sensor 100 of the first comparative example. As shown in FIG. 9, the inductive sensor 100 of the first comparative example exhibits an abnormal output when the target 20 falls off. Also, although not shown in the drawings, even if the inductive sensor 100 of the first comparative example is configured to be capable of outputting multiple detection values from the circuit board 10, when the target 20 falls off, all of the detection values will have abnormal outputs.

In contrast to the first comparative example described above, the inductive sensor 1 and the brake pedal device 2 of the first embodiment have the following configuration, and provide the following advantageous effects.

(1) The inductive sensor 1 of the first embodiment includes multiple targets 20 fixed to a detection object (e.g., the shaft 7 or the brake pedal 8) to move in synchronization with the movement of the detection object. According to the above, even if one of the multiple targets 20 falls off or is deformed, the position of the detection object can be correctly detected by the other target 20 and the transceiver coil 30. Therefore, the inductive sensor 1 can ensure redundancy in detecting the position of the detection object even if the target 20 falls off or is deformed.

(2) The brake pedal device 2 of the first embodiment detects the position (specifically, the rotation angle) of the shaft 7 and the brake pedal 8 as detection objects by the inductive sensor 1 having multiple targets 20. According to the above, in the brake-by-wire system 5, if the inductive sensor 1 that detects the position of the shaft 7 of the brake pedal device 2 and the brake pedal 8 suffers from loss of functions, there is a risk that braking of the vehicle will be hindered. In contrast, in the brake pedal device 2 of the first embodiment, the inductive sensor 1 has the multiple targets 20, redundancy in the position detection of the shaft 7 and the brake pedal 8 is ensured even if the target 20 has fallen off or is deformed. Therefore, the brake pedal device 2 can improve the safety of the vehicle braking by the brake-by-wire system 5.

Second Embodiment

The following describes the second embodiment of the present disclosure. In the second embodiment, the configuration of the inductive sensor 1 is changed from that of the first embodiment, but other aspects are similar to those of the first embodiment. Therefore, only the parts that differ from the first embodiment will be described.

Figure 10:
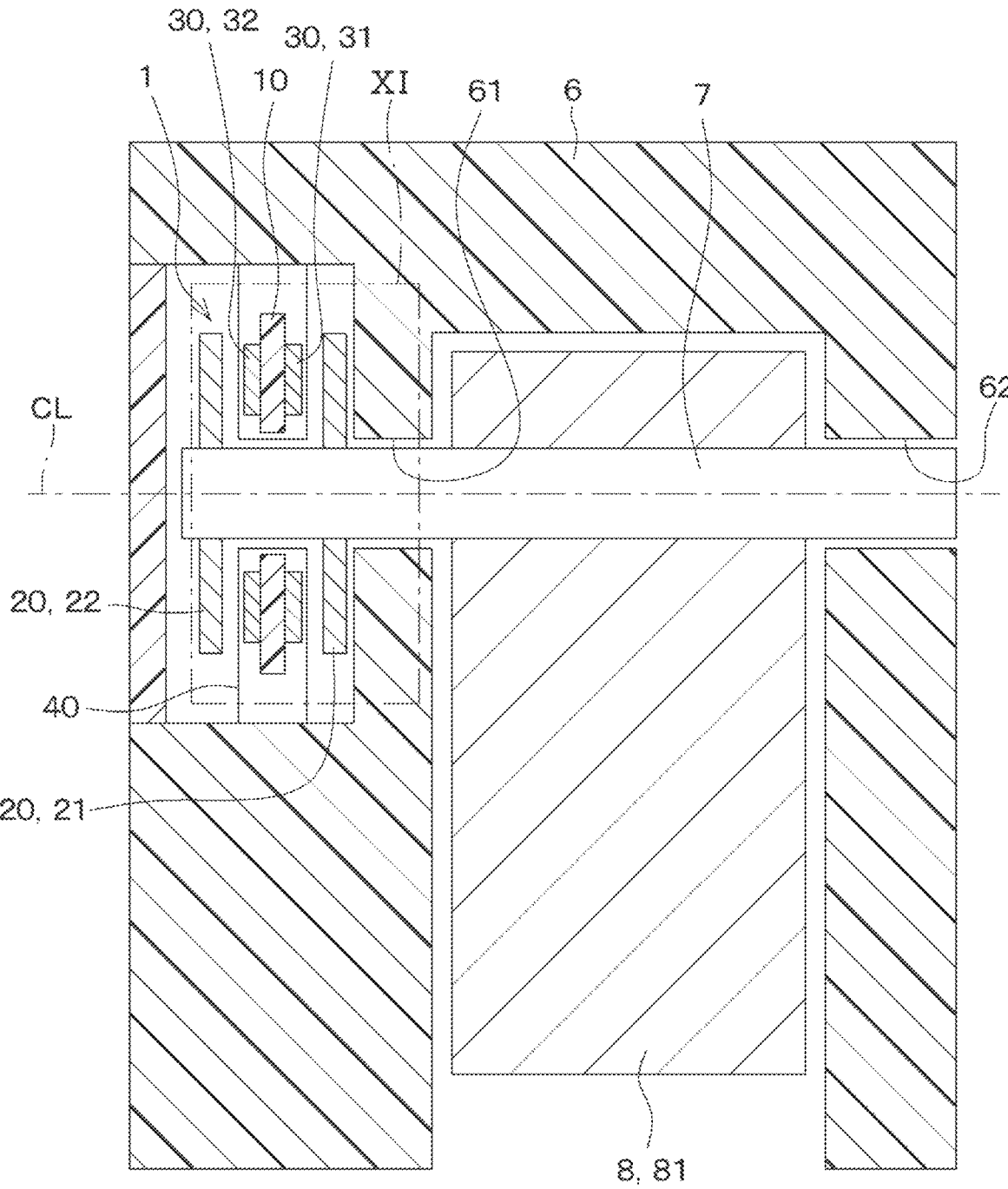
FIG. 10 is a cross-sectional view showing a portion corresponding to FIG. 4 in a brake pedal device including an inductive sensor according to a second embodiment.
Figure 11:
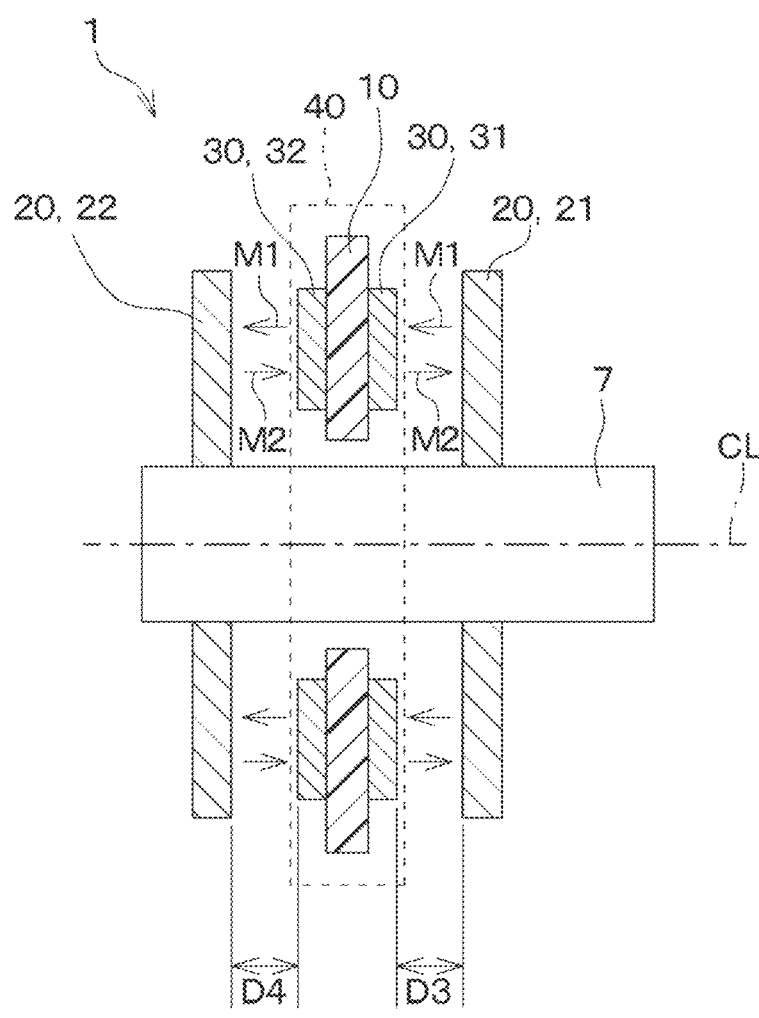
FIG. 11 is an enlarged view of a portion XI in FIG. 10, and is a cross-sectional view parallel to the axis of the shaft in the inductive sensor according to the second embodiment.

As shown in FIGS. 10 and 11, in the second embodiment, an inductive sensor 1 has multiple transceiver coils 30 implemented on a single circuit board 10, and is configured to be capable of outputting multiple detection values. Of the multiple transceiver coils 30, a first transceiver coil 31 is implemented on one surface of the circuit board 10. Of the multiple transceiver coils 30, a second transceiver coil 32 is implemented on the other surface of the circuit board 10. One circuit board 10 and multiple transceiver coils 30 (specifically, a first transceiver coil 31 and a second transceiver coil 32) implemented thereon are stored in a sensor case 40, and are fixed to a housing 6 as a fixed body.

Multiple targets 20 include a first target 21 and a second target 22. The first target 21 is arranged on one side of the circuit board 10 in the thickness direction, and the second target 22 is arranged on the other side of the circuit board 10 in the plate thickness direction. The first target 21 and the second target 22 are fixed to the shaft 7 as a detection object. Therefore, the first target 21 and the second target 22 move in synchronization with the shaft 7.

Although not shown in the drawing, the first target 21 and the second target 22, similar to what is shown in FIG. 6 in the first embodiment, have cylinder portions 211, 221 that surround the radially-outward outer wall of the shaft 7, and multiple blades 212, 222 that extend radially outward from the cylinder portions 211, 221. The multiple blades 212, 222 of the first target 21 and the second target 22, respectively, are provided at predetermined intervals in the circumferential direction about the entire circumference of the cylinder portions 211, 221. By providing multiple blades 212, 222 over the entire circumferential range of the cylinder portions 211, 221, it is possible to increase the output of the inductive sensor 1.

As shown in FIG. 11, a distance D3 between the first target 21 and the first transceiver coil 31 is set to a distance at which mutual induction occurs. Therefore, the first transceiver coil 31 can output a signal according to the position of the first target 21. Further, a distance D4 between the second target 22 and the second transceiver coil 32 is also set to a distance at which mutual induction occurs. Therefore, the second transceiver coil 32 can output a signal according to the position of the second target 22.

In the second embodiment, the distance D3 between the first target 21 and the first transceiver coil 31 and the distance D4 between the second target 22 and the second transceiver coil 32 are the same. In the present specification, "the distance D3 and the distance D4 are the same" includes a state in which the distances are completely the same as each other, as well as a state in which they are slightly different due to manufacturing tolerances. By making the distances D3 and D4 the same, it is possible to easily compare the two detection values output from the first transceiver coil 31 and the second transceiver coil 32, with no or simple post-processing of the signals in the ECU 3.

The inductive sensor 1 and the brake pedal device 2 of the second embodiment described above have the following configuration and the resulting functions and effects in addition to the functions and effects described in the first embodiment.

(1) In the second embodiment, the multiple targets 20 include at least a first target 21 and a second target 22. The transceiver coil 30 has at least a first transceiver coil 31 that outputs a detection value corresponding to the position of the first target 21, and a second transceiver coil 32 that outputs a detection value corresponding to the position of the second target 22. According to the above, the inductive sensor 1 includes a first sensor unit constituted by the first target 21 and the first transceiver coil 31, and a second sensor unit constituted by the second target 22 and the second transceiver coil 32. Therefore, even if one of the first sensor unit and the second sensor unit suffers from loss of functions or falls off, the position of the detection object is correctly detectable by the other sensor unit. Therefore, the inductive sensor 1 can ensure redundancy in detecting the position of the detection object even if the target 20 falls off or is deformed.

(2) In the second embodiment, the distance D3 between the first target 21 and the first transceiver coil 31 and the distance D4 between the second target 22 and the second transceiver coil 32 are the same. According to the above, regarding the position detection of the detection object, it is possible to make the detection value of the first sensor unit and the detection value of the second sensor unit substantially the same. Therefore, in the ECU 3 to which the detection value of the inductive sensor 1 is transmitted, the signal post-processing of the detection value of the first sensor unit and the detection value of the second sensor unit is eliminated or simplified, making it possible to easily compare the two detection values.

Further, even if for some reason either the first target 21 or the second target 22 falls off the shaft 7 and the position of the detection object is detected using the other target 20, a signal amplitude of the sensor output does not decrease. If the signal amplitude is large, the S/N ratio (i.e., signal-to-noise ratio) becomes large and the effect of noise in transmission becomes small, thereby enabling a high accuracy detection of the position of the detection object.

(3) In the second embodiment, the first transceiver coil 31 is implemented on one surface of one circuit board 10, and the second transceiver coil 32 is implemented on the other surface thereof. Further, the first target 21 is arranged on one side of the circuit board 10 in the plate thickness direction, and the second target 22 is arranged on the other side of the circuit board 10 in the plate thickness direction. With such a configuration, it is possible to make the distance D3 between the first target 21 and the first transceiver coil 31 and the distance D4 between the second target 22 and the second transceiver coil 32 the same.

Third Embodiment

The following describes the third embodiment of the present disclosure. The third embodiment is different from the second embodiment in that the method of fixing the target provided in the inductive sensor 1 is changed, but other aspects are similar to the second embodiment, so only the differences from the second embodiment will be described.

Figure 12:
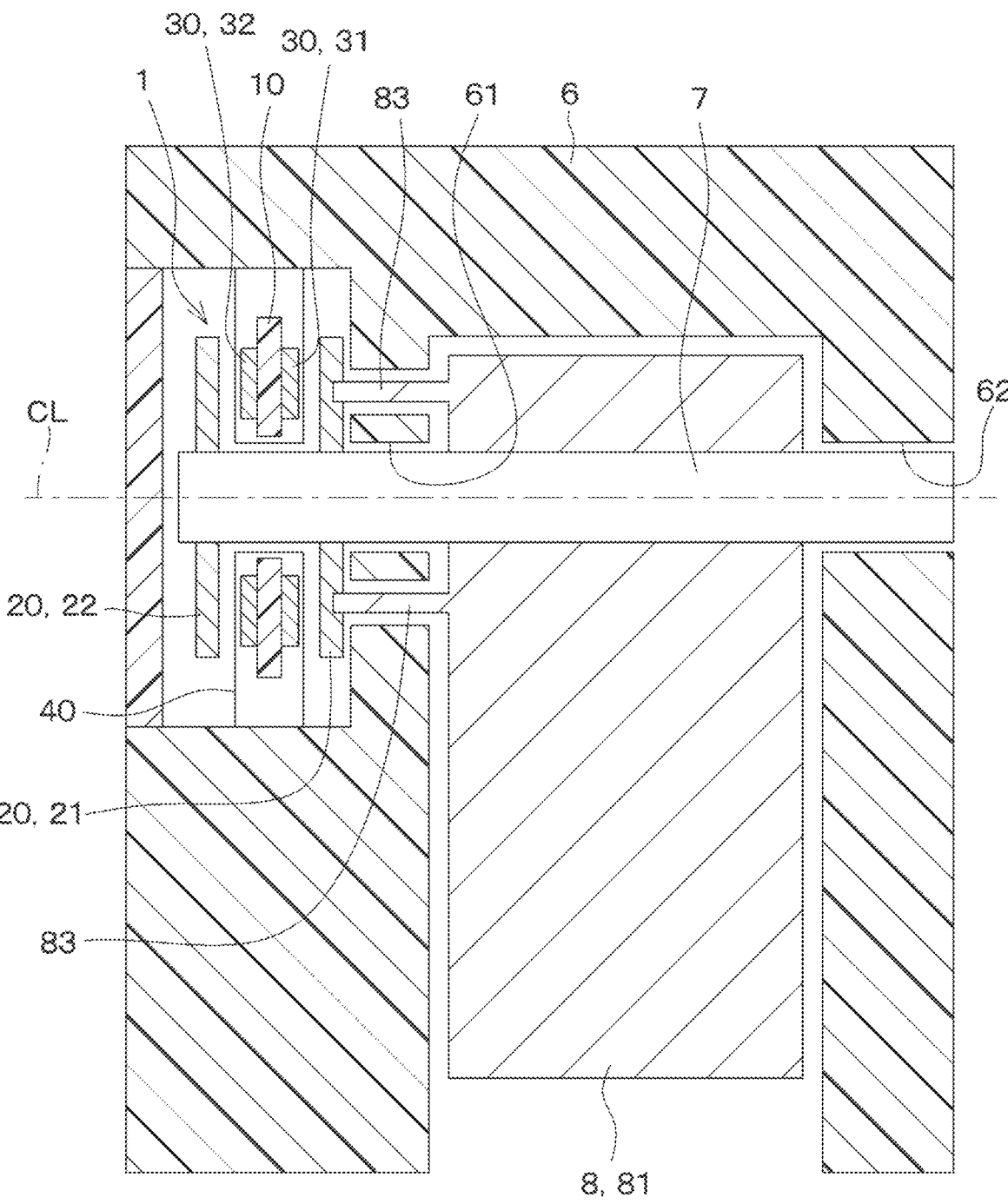
FIG. 12 is a cross-sectional view showing a portion corresponding to FIG. 4 in a brake pedal device including an inductive sensor according to a third embodiment.

As shown in FIG. 12, an inductive sensor 1 of the third embodiment also includes a circuit board 10 and multiple targets 20. Of the multiple targets 20, a second target 22 is fixed to a shaft 7. Of the multiple targets 20, a first target 21 is fixed to a pedal arm 81 as an example of a part that operates in synchronization with the shaft 7. Specifically, the first target 21 is fixed to multiple arms 83 extending axially from the pedal arm 81.

As described above, in the third embodiment, the parts to which the multiple targets 20 are fixed do not need to be the same, and may be any parts that are synchronized with the rotation of the detection object.

Fourth Embodiment

The following describes the fourth embodiment of the present disclosure. The fourth embodiment is different from the first embodiment in the configuration of the inductive sensor 1, but is otherwise similar to the first embodiment, so only the parts that differ from the first embodiment will be described.

Figure 13:
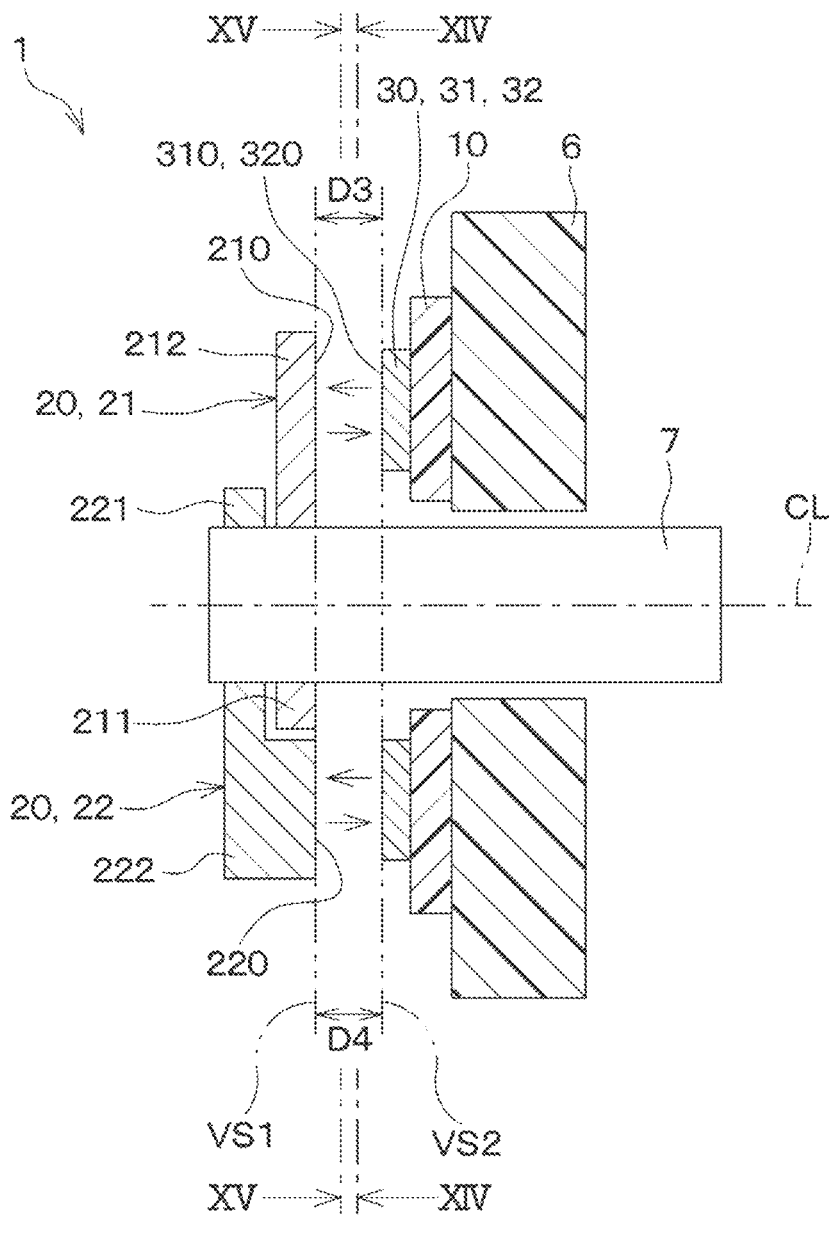
FIG. 13 is a cross-sectional view parallel to an axis of a shaft in an inductive sensor according to a fourth embodiment.
Figure 14:
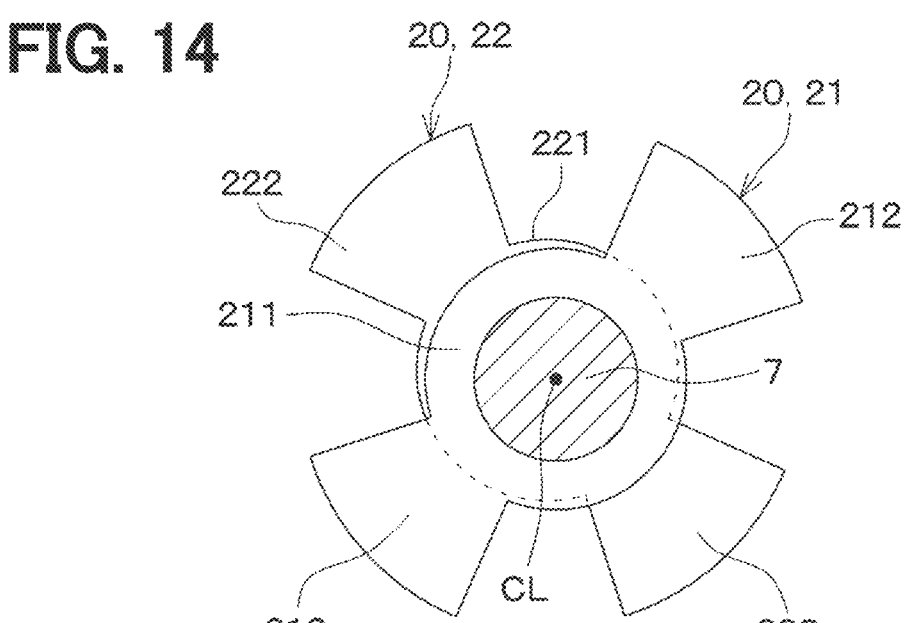
FIG. 14 is a cross-sectional view taken along a line XIV-XIV of FIG. 13.
Figure 15:
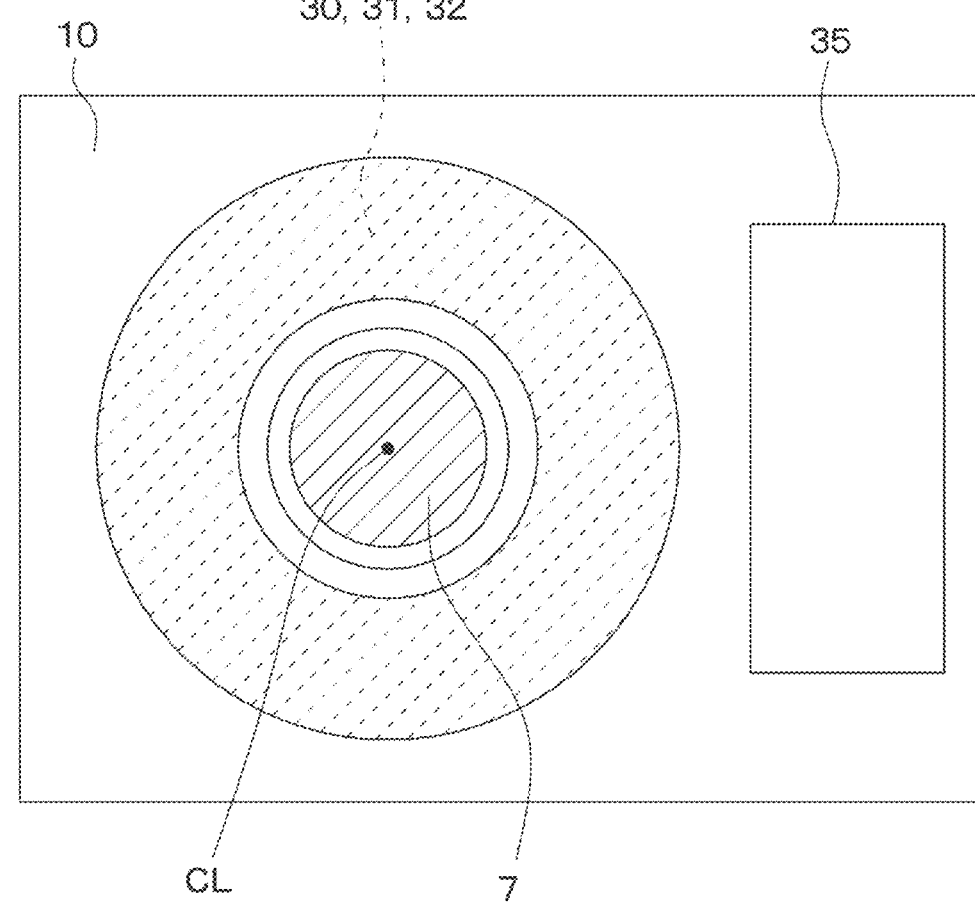
FIG. 15 is a cross-sectional view taken along a line XV-XV of FIG. 13.

As shown in FIGS. 13 to 15, in the fourth embodiment, an inductive sensor 1 also includes a circuit board 10 and multiple targets 20.

As shown in FIGS. 13 and 14, the multiple targets 20 include a first target 21 and a second target 22. As shown in FIG. 14, the first target 21 and the second target 22 each have a cylinder portion 211, 221 surrounding the radially-outward outer wall of a shaft 7, and multiple blades 212, 222 extending radially outward from the cylinder portions 211, 221. As shown in FIG. 13, the cylinder portion 211 of the first target 21 and the cylinder portion 221 of the second target 22 are fixed to the shaft 7.

As shown in FIG. 14, the multiple blades 212 of the first target 21 and the multiple blades 222 of the second target 22 are arranged at positions offset in the circumferential direction (in other words, positions that do not overlap in the axial direction). Further, as shown in FIG. 13, a surface 210 of each of the multiple blades 212 of the first target 21 that faces a first transceiver coil 31 is arranged on a first imaginary plane VS1. Further, a surface 220 of each of the multiple blades 222 of the second target 22 that faces a second transceiver coil 32 is also arranged on the first imaginary plane VS1.

Further, as shown in FIG. 15, the inductive sensor 1 of the fourth embodiment has multiple transceiver coils 30 implemented on one circuit board 10, and is configured to be capable of outputting multiple detection values. Of the multiple transceiver coils 30, the first transceiver coil 31 and the second transceiver coil 32 are implemented in an electrically independent state. The first transceiver coil 31 and the second transceiver coil 32 are implemented in a stacked state on one surface of the circuit board 10.

In FIG. 15, an area on the circuit board 10 where the first transceiver coil 31 and the second transceiver coil 32 are implemented is shown as hatched with dashed lines, although it is not a cross section. Further, the coils constituting the transceiver coil 30 may have various shapes (for example, a sinusoidal shape). As shown in FIG. 13, the circuit board 10 on which the multiple transceiver coils 30 and a transceiver circuit 35 (i.e., sending and receiving circuit) are implemented is fixed to a housing 6 serving as a fixed body.

As shown in FIG. 13, the first transceiver coil 31 and the second transceiver coil 32 are arranged on the circuit board 10 on a second imaginary plane VS2 that is parallel to the first imaginary plane VS1. In the present specification, "the first transceiver coil 31 and the second transceiver coil 32 are arranged on the second imaginary plane" includes a state in which the first transceiver coil 31, the second transceiver coil 32 and the second imaginary plane are exactly aligned, as well as a state in which they are slightly misaligned. An example of the slight misaligned state is a state in which the first transceiver coil 31, the second transceiver coil 32, and the second imaginary plane are slightly misaligned by the thickness of a coil wire and the thickness of a layer of the circuit board 10.

The inductive sensor 1 and the brake pedal device 2 of the fourth embodiment described above have the following configuration and the resulting functions and effects in addition to the functions and effects described in the first embodiment and the like.

In the fourth embodiment, the surface 210 of the first target 21 facing the first transceiver coil 31 and the surface 220 of the second target 22 facing the second transceiver coil 32 are arranged on the first imaginary plane VS1. In addition, the surface 310 of the first transceiver coil 31 facing the first target 21 and the surface 320 of the second transceiver coil 32 facing the second target 22 are arranged on the second imaginary plane VS2 parallel to the first imaginary plane VS1. With such an arrangement, even in the fourth embodiment, it is possible to make the distance D3 between the first target 21 and the first transceiver coil 31 and the distance D4 between the second target 22 and the second transceiver coil 32 the same. Therefore, even if either one of the first target 21 or the second target 22 falls off the shaft 7 for some reason and the position of the detection object is detected using the other target 20, the signal amplitude of the sensor output does not become small. If the signal amplitude is large, the S/N ratio (i.e., signal-to-noise ratio) becomes large and the effect of noise in transmission becomes small, thereby enabling a high accuracy detection of the position of the detection object.

Further, according to the configuration of the fourth embodiment, there is only one detection gap between the multiple targets 20 and the transceiver coil 30, thereby enabling a volume reduction of the inductive sensor 1 in the axial direction of the shaft 7, than the one in the second and third embodiments.

Fifth Embodiment

The following describes the fifth embodiment of the present disclosure. The fifth embodiment is similar to the first embodiment in other respects except for the configuration of the inductive sensor 1, and therefore only the parts that differ from the first embodiment will be described.

Figure 16:
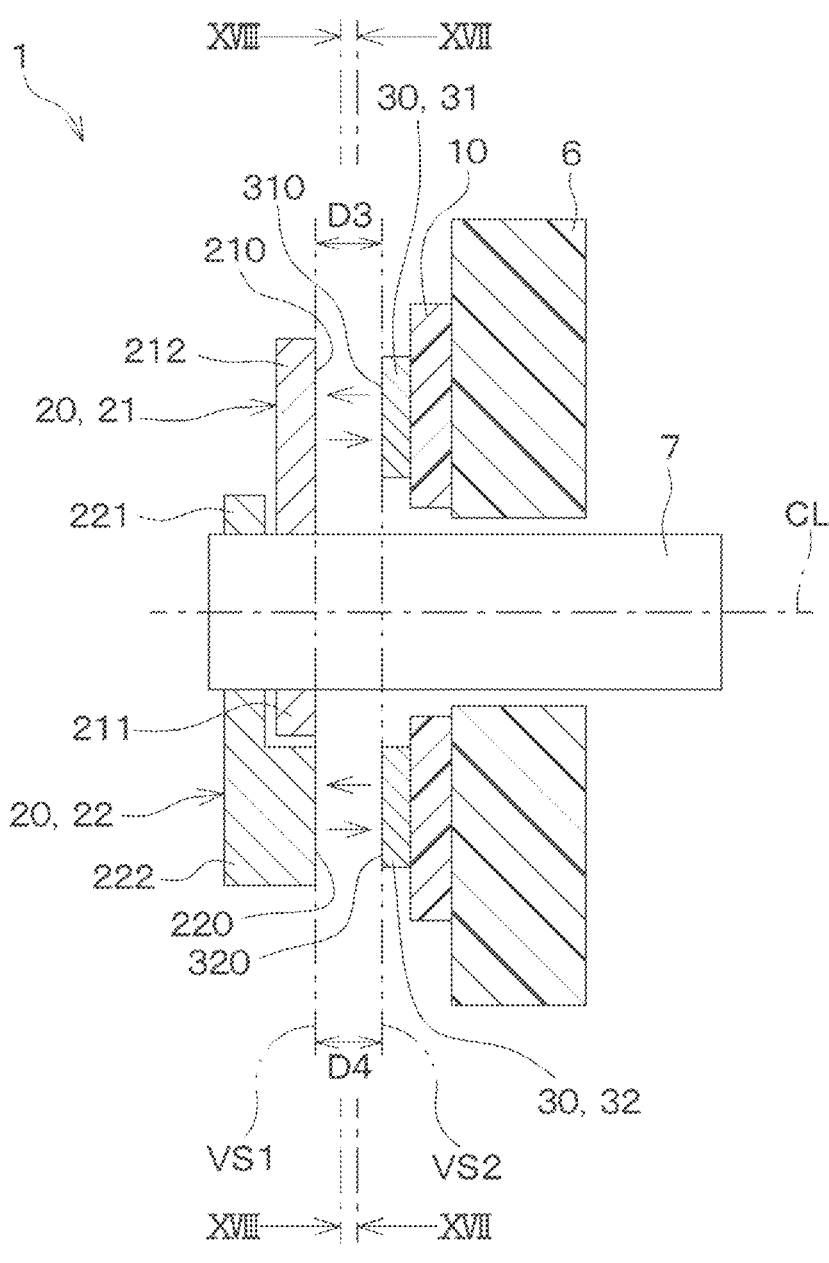
FIG. 16 is a cross-sectional view parallel to an axis of a shaft in an inductive sensor according to a fifth embodiment.
Figure 17:
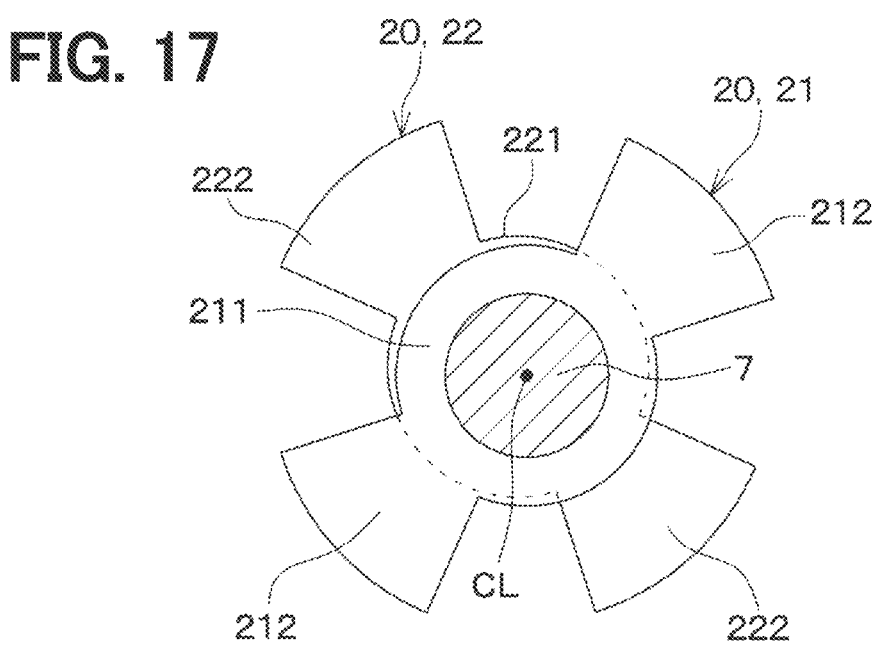
FIG. 17 is a cross-sectional view taken along a line XVII-XVII in FIG. 16.
Figure 18:
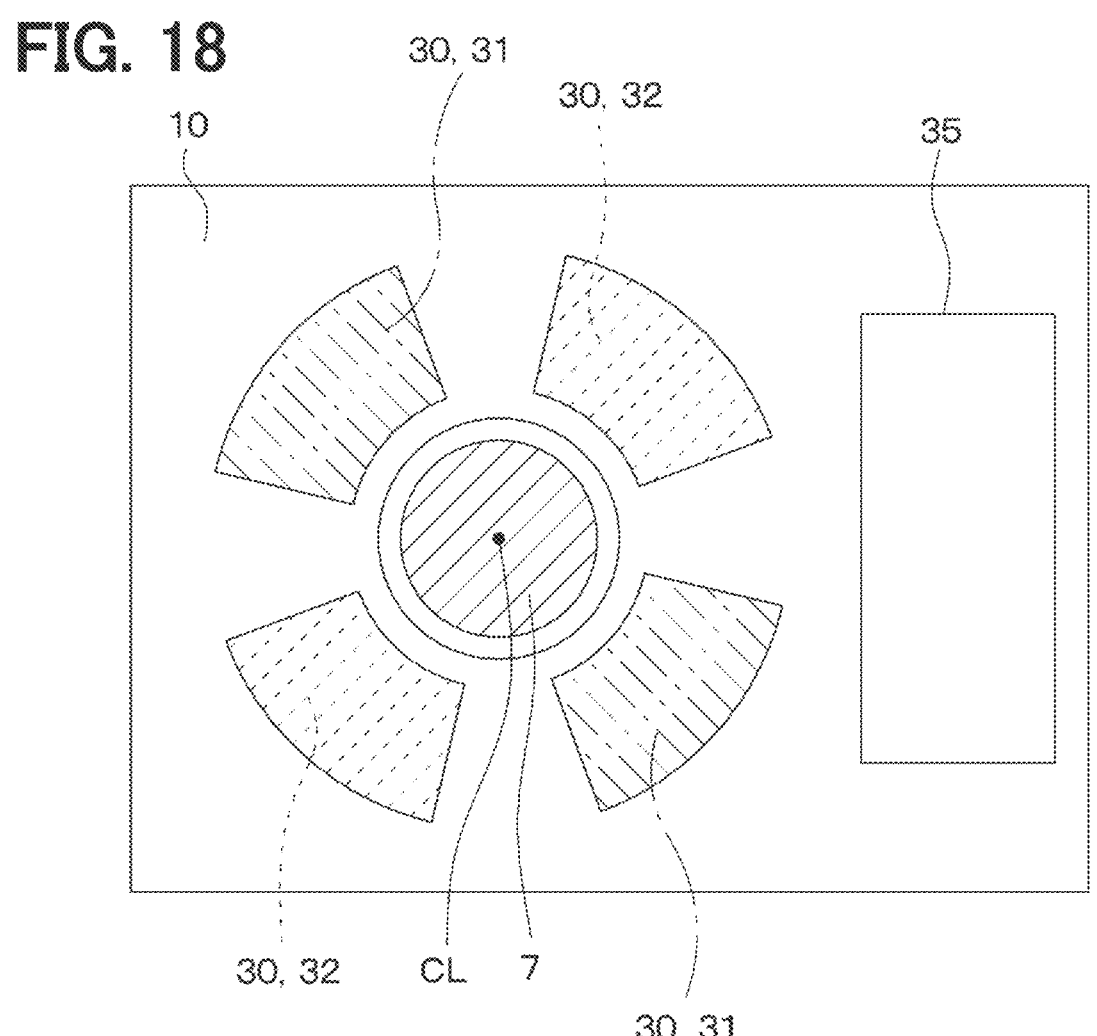
FIG. 18 is a cross-sectional view taken along a line XVIII-XVIII in FIG. 16.

As shown in FIGS. 16 to 18, in the fifth embodiment, an inductive sensor 1 also includes a circuit board 10 and multiple targets 20. The multiple targets 20 are the same as those described in the fourth embodiment. That is, as shown in FIG. 16, a surface 210 of each of multiple blades 212 of a first target 21 that faces a first transceiver coil 31 is arranged on a first imaginary plane VS1. Further, a surface 220 of each of the multiple blades 222 of the second target 22 that faces a second transceiver coil 32 is also arranged on the first imaginary plane VS1.

As shown in FIG. 18, the inductive sensor 1 of the fifth embodiment also has multiple transceiver coils 30 implemented on a single circuit board 10, and is configured to be capable of outputting multiple detection values. Of the multiple transceiver coils 30, a first transceiver coil 31 and a second transceiver coil 32 are implemented in an electrically independent state. In FIG. 18, an area on the circuit board 10 where the first transceiver coil 31 is implemented is shown as hatched with dashed lines, although it is not a cross section. Further, the area on the circuit board 10 where the second transceiver coil 32 is implemented is shown as hatched with dashed lines, although it is not a cross section. The first transceiver coil 31 and the second transceiver coil 32 are implemented in different areas on one surface of the circuit board 10. By implementing the first transceiver coil 31 and the second transceiver coil 32 in different areas, it is possible to prevent the first transceiver coil 31 and the second transceiver coil 32 from being influenced by each other's magnetic fields. Therefore, even if one of the first transceiver coil 31 or the second transceiver coil 32 fails for some reason and the position of the detection object is detected using the other transceiver coil 30, the output signal of the sensor is prevented from being affected.

The coils constituting the transceiver coil 30 may have various shapes (for example, a sinusoidal shape). As shown in FIG. 16, the circuit board 10 on which the multiple transceiver coils 30 and the transceiver circuit 35 are implemented is fixed to a housing 6 serving as a fixed body. Also in the fifth embodiment, the first transceiver coil 31 and the second transceiver coil 32 are arranged on the circuit board 10 on a second imaginary plane VS2 that is parallel to the first imaginary plane VS1. Therefore, the distance D3 between the first target 21 and the first transceiver coil 31 and the distance D4 between the second target 22 and the second transceiver coil 32 are the same.

The inductive sensor 1 and the brake pedal device 2 of the fifth embodiment described above have the following configuration and the resulting functions and effects in addition to the functions and effects described in the first embodiment and the like.

In the fifth embodiment, the first transceiver coil 31 and the second transceiver coil 32 are implemented in different areas on one surface of the circuit board 10. Therefore, it is possible to prevent the first transceiver coil 31 and the second transceiver coil 32 from being influenced by each other's magnetic fields. Therefore, even if one of the first transceiver coil 31 or the second transceiver coil 32 fails for some reason and the position of the detection object is detected using the other transceiver coil 30, it is possible to prevent the sensor output signal from being affected.

Also in the fifth embodiment, there is only one detection gap between the multiple targets 20 and the transceiver coil 30, thereby enabling a volume reduction of the inductive sensor 1 in the axial direction of the shaft 7 relative to the one in the second and third embodiments.

Sixth Embodiment

The following describes the sixth embodiment of the present disclosure. The sixth embodiment is similar to the first embodiment in other aspects except for the configuration of the inductive sensor 1, and therefore only the parts that differ from the first embodiment will be described.

Figure 19:
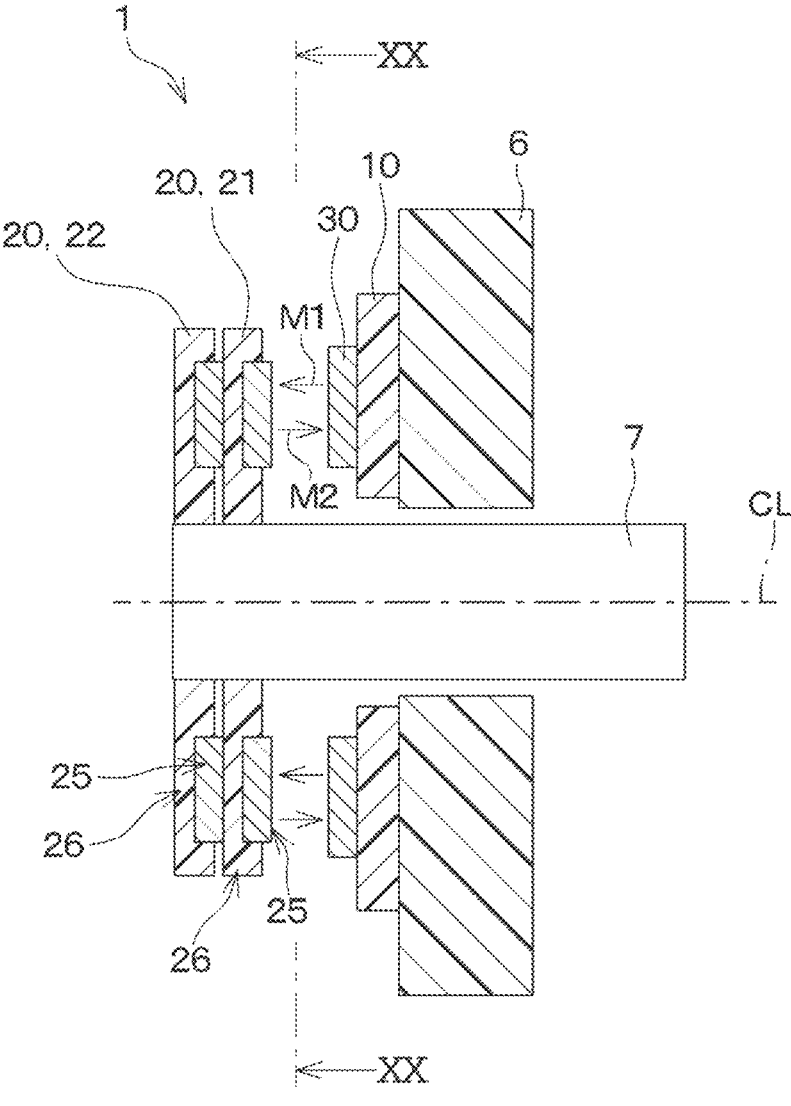
FIG. 19 is a cross-sectional view parallel to an axis of a shaft in an inductive sensor according to a sixth embodiment.
Figure 20:
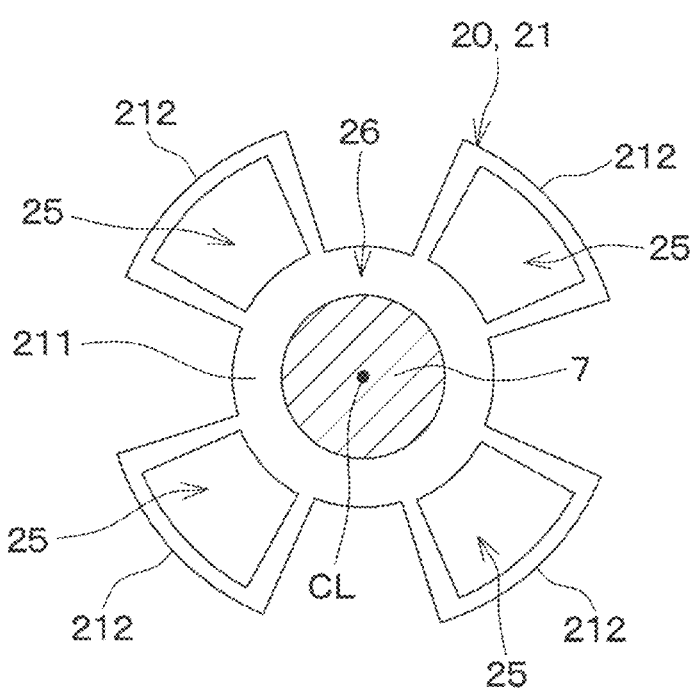
FIG. 20 is a cross-sectional view taken along a line XX-XX in FIG. 19.

As shown in FIGS. 19 and 20, in the sixth embodiment, an inductive sensor 1 also includes a circuit board 10 and multiple targets 20. At least one of the multiple targets 20 has at least a part of a portion facing a transceiver coil 30 formed of a conductor 25, and a remaining portion formed of an insulator 26. Specifically, in the sixth embodiment, in the first target 21, a cylinder portion 211 and a portion of the blades 212 opposite to the transceiver coil 30 are formed of the insulator 26. The insulator 26 is made of, for example, resin. On the other hand, in the first target 21, a portion of the blades 212 on a transceiver coil 30 side is formed of the conductor 25. The conductor 25 is made of a metal such as aluminum, for example.

Like the first target 21, with respect to the second target 22, at least a portion facing the transceiver coil 30 may be formed of the conductor 25, and a remaining portion may be formed of the insulator 26.

The inductive sensor 1 and the brake pedal device 2 of the sixth embodiment described above have the following configuration and the resulting functions and effects in addition to the functions and effects described in the first embodiment and the like.

(1) In the sixth embodiment, at least one of the multiple targets 20 has at least a portion thereof facing the transceiver coil 30 formed of the conductor 25, and a remaining portion formed of the insulator 26. According to the above, in the target 20, it is possible to form a portion requiring the function of canceling the magnetic field by using the conductor 25, and to form the remaining portion by selecting a low-cost insulating material.

(2) In the sixth embodiment, the insulator 26 forming a portion of the target 20 is made of resin, and the resin is used at the portion where the target 20 is fixed to the detection object (specifically, to the shaft 7). According to the above, if the entire target 20 are made of metal as the conductor 25, a portion of the target 20 that is fixed to the detection object would rust, and there would be a risk that the target 20 would fall off from the detection object. In contrast, in the sixth embodiment, a portion of the target 20 that is fixed to the detection object is made of resin, which makes it possible to prevent the target 20 from falling off due to rust or the like. Further, even if a portion of the target 20 that is fixed to the detection object has a complex shape, such a shape can easily be made by injection molding when it is made of resin.

(3) In the description of the sixth embodiment above, it is described that, for at least one of the multiple targets 20, the portion facing the transceiver coil 30 is formed of the conductor 25 and the remaining portion is formed of the insulator 26. However, the present disclosure is not limited thereto. For example, by configuring the multiple targets 20 as follows, it is possible to achieve further redundancy for fixation of the target 20. In other words, when two or more targets 20 are provided, the targets 20 are provided at least in two types: one type in which the entire target 20 is made of the conductor 25 (e.g., aluminum), and other type in which a portion of the target 20 that is fixed to the detection object is made of an insulator (e.g., resin). The reason is that, if both targets 20 are made of aluminum, there is a risk that both would corrode due to the same factor. Further, if both of the targets 20 are made of resin, at high temperatures the portions of the targets 20 that are fixed to the detection object would creep, weakening the fixing force to the shaft 7 and causing both targets to fall off. In contrast, when two or more targets 20 are provided, by providing at least two types for the targets 20: one type in which the entire target 20 is made of the conductor 25 (e.g., aluminum), and other type in which the portion of the target 20 that is fixed to the detection object is made of an insulator (e.g., resin). In such manner, falling off of all of the targets 20 due to the same factor is preventable, thereby further redundancy for fixation is achievable.

Seventh Embodiment

The following describes the seventh embodiment of the present disclosure. The seventh embodiment is similar to the first embodiment in other aspects except for the configuration of the inductive sensor 1, and therefore only the parts that differ from the first embodiment will be described.

Figure 21:
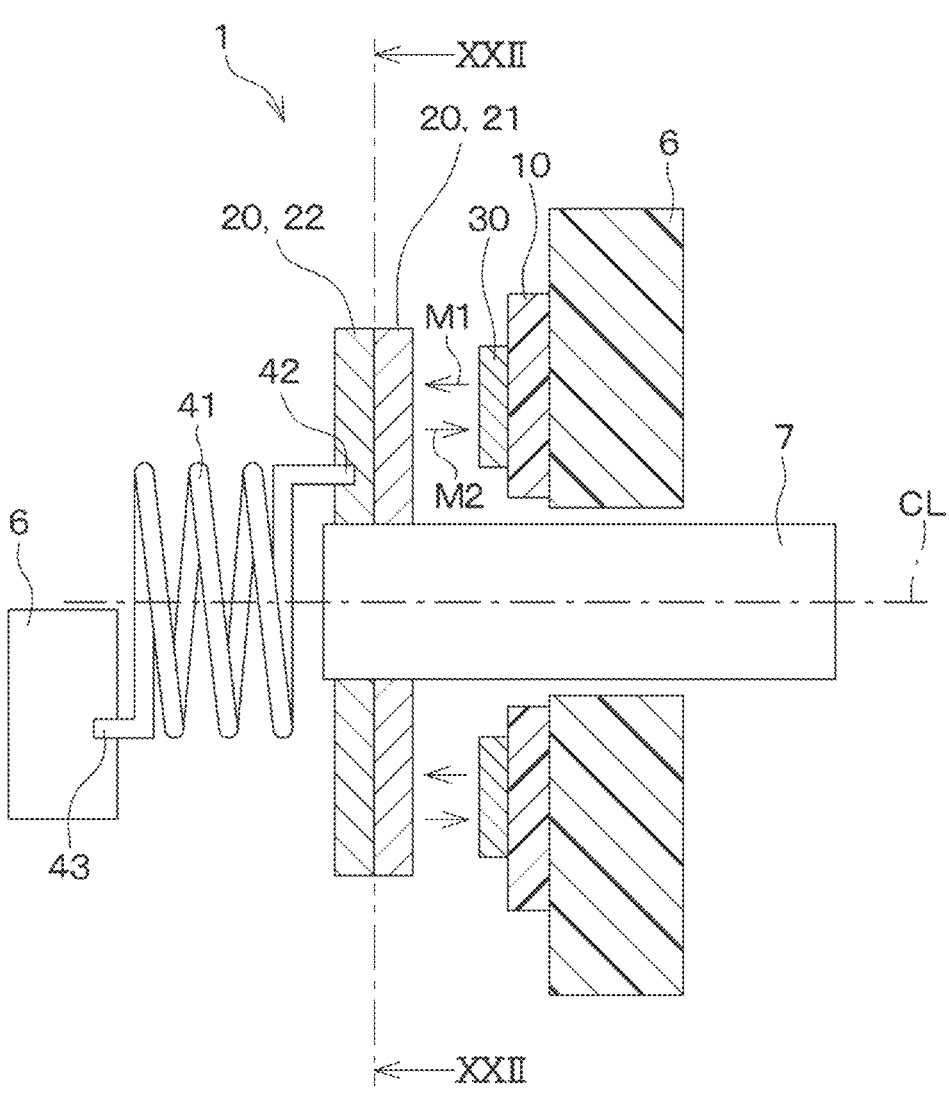
FIG. 21 is a cross-sectional view parallel to an axis of a shaft in an inductive sensor according to a seventh embodiment.
Figure 22:
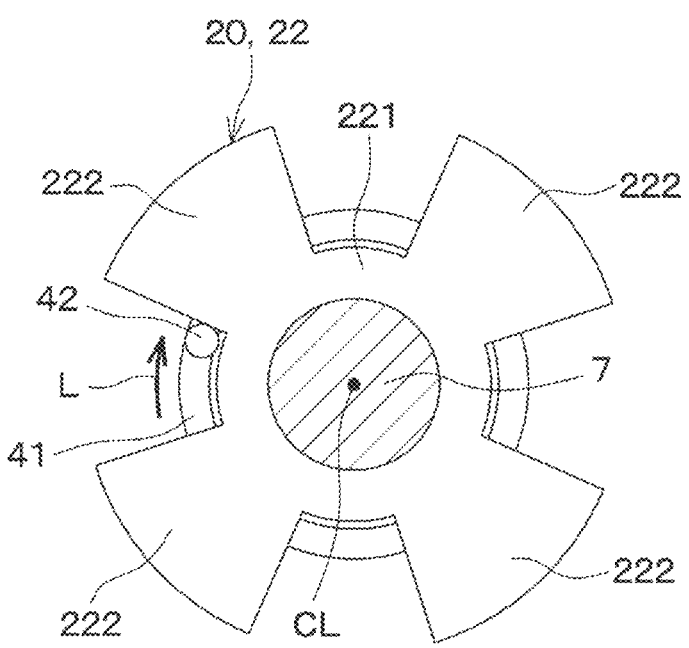
FIG. 22 is a cross-sectional view taken along a line XXII-XXII in FIG. 16.

As shown in FIGS. 21 and 22, in the seventh embodiment, an inductive sensor 1 includes a circuit board 10, multiple targets 20, and a torsion spring 41. As indicated by an arrow L in FIG. 22, the torsion spring 41 applies, to at least one of the multiple targets 20, a load in the circumferential direction about an axis CL of a shaft 7. Specifically, in the seventh embodiment, the torsion spring 41 applies a load to a second target 22. One end 42 of the torsion spring 41 is anchored to a part of a second target 22, and an other end 43 of the torsion spring 41 is anchored to a part of a housing 6 serving as a fixed body.

In the seventh embodiment, the torsion spring 41 applies a load only to the second target 22, but the present disclosure is not limited thereto. For example, the torsion spring 41 may apply a load only to the first target 21, or may apply a load to both of the first target 21 and the second target 22.

The inductive sensor 1 and the brake pedal device 2 of the seventh embodiment described above have the following configuration and the resulting functions and effects in addition to the functions and effects described in the first embodiment and the like.

In the seventh embodiment, the torsion spring 41 applies, to at least one of the multiple targets 20, a load in the circumferential direction centered on the axis CL. According to the above, even if the target 20 has a slight deviation in the circumferential direction centered on the axis CL, the target 20 is pressed to one side in the circumferential direction by a biasing force of the torsion spring 41, thereby preventing the target 20 from rattling.

Eighth Embodiment

Figure 23:
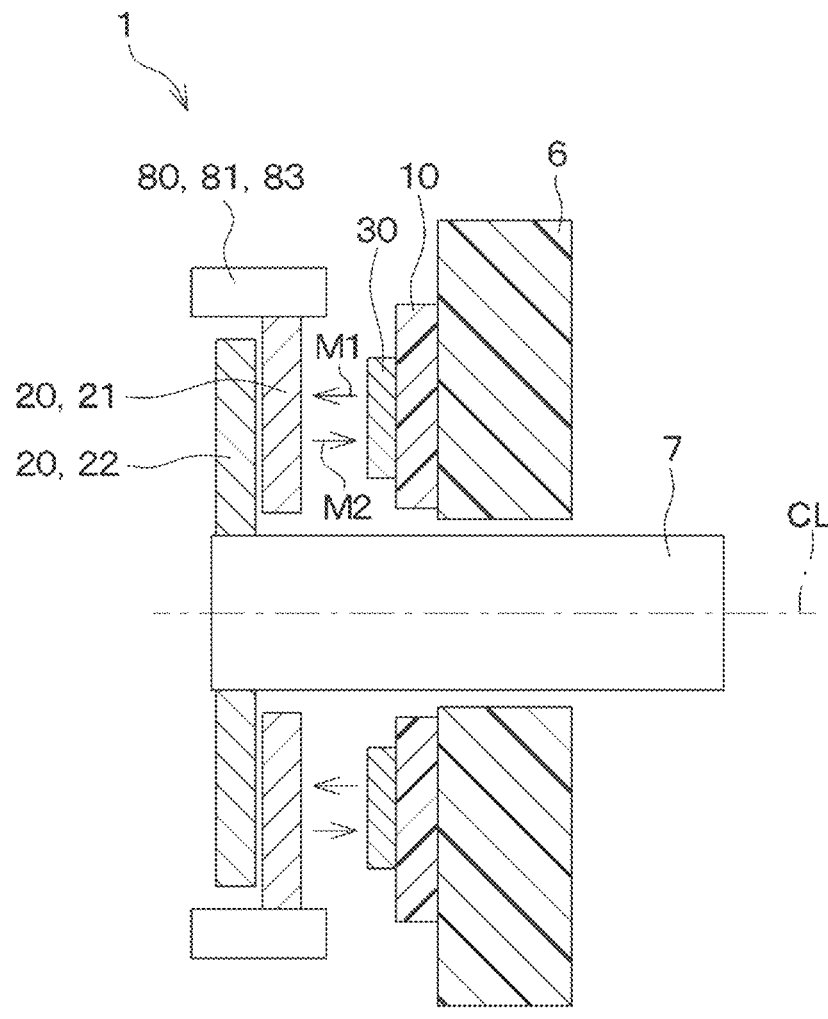
FIG. 23 is a cross-sectional view parallel to an axis of a shaft in an inductive sensor according to an eighth embodiment.

The eighth embodiment will be described. The eighth embodiment is a modification of the first embodiment. As shown in FIG. 23, an inductive sensor 1 of the eighth embodiment also includes a circuit board 10 and multiple targets 20. A first target 21 from among the multiple targets 20 is fixed to a member 80 that operates in synchronization with a rotating body (e.g., a shaft 7) as a detection object. The member 80 is, for example, a pedal arm 81 or a part connected thereto (for example, the arms 83 described in the third embodiment). Of the multiple targets 20, a second target 22 is fixed to a rotating body (for example, the shaft 7).

As described above, in the eighth embodiment, the parts to which the multiple targets 20 are respectively fixed do not need to be identical, and may be any parts that operate in synchronization with the rotation of the detection object.

Ninth Embodiment

The ninth embodiment will be described. The ninth embodiment is a modification of the first embodiment.

Figure 24:
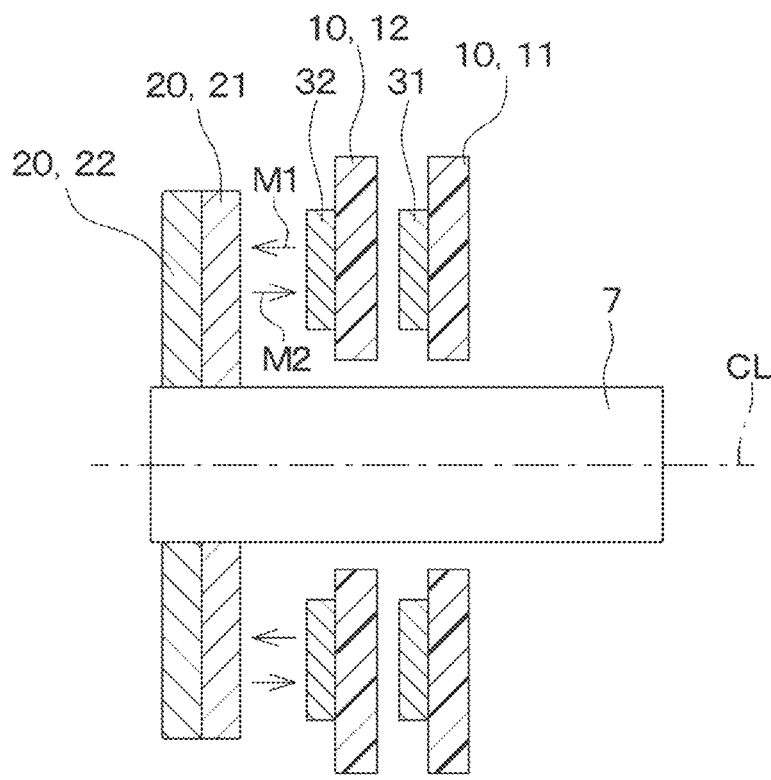
FIG. 24 is a cross-sectional view taken along a line parallel to an axis of a shaft in an inductive sensor according to a ninth embodiment.

As shown in FIG. 24, an inductive sensor 1 of the ninth embodiment includes multiple circuit boards 10 and multiple targets 20. The multiple targets 20 are fixed to a shaft 7 as a detection object. Therefore, the multiple targets 20 move in synchronization with the shaft 7. For the ease of explanation, the target 20 that is arranged on a circuit board 10 side is referred to as a first target 21, and the target 20 that is arranged on the opposite side of the first target 21 from the circuit boards 10 is referred to as a second target 22.

On the other hand, the multiple circuit boards 10 include a first circuit board 11 and a second circuit board 12. The first circuit board 11 and the second circuit board 12 are arranged side by side in the axial direction of the shaft 7, and both are fixed to the housing 6 serving as a fixed body. For the ease of explanation, from among the multiple circuit boards 10, the circuit board 10 that is arranged on one side closer to the targets 20 is referred to as the second circuit board 12, and the circuit board 10 that is arranged on the opposite side of the targets 20 across the second circuit board 12 is referred to as the first circuit board 11. A first transceiver coil 31 is implemented on the first circuit board 11. A second transceiver coil 32 is implemented on the second circuit board 12.

In normal operation, the first transceiver coil 31 detects an angle of the first target 21. The second transceiver coil 32 also detects an angle of the first target 21.

On the other hand, if the first target 21 falls completely off the shaft 7 for some reason, a detection gap between the first transceiver coil 31 and the second target 22 will become large, and there is a risk that the first transceiver coil 31 will be undetectable or will be erroneously detected. However, the second transceiver coil 32 is capable of detecting an angle of the second target 22.

The inductive sensor 1 and the brake pedal device 2 of the ninth embodiment described above can also ensure redundancy in detecting the position of the detection object in an event that the target 20 falls off.

Tenth Embodiment

Figure 25:
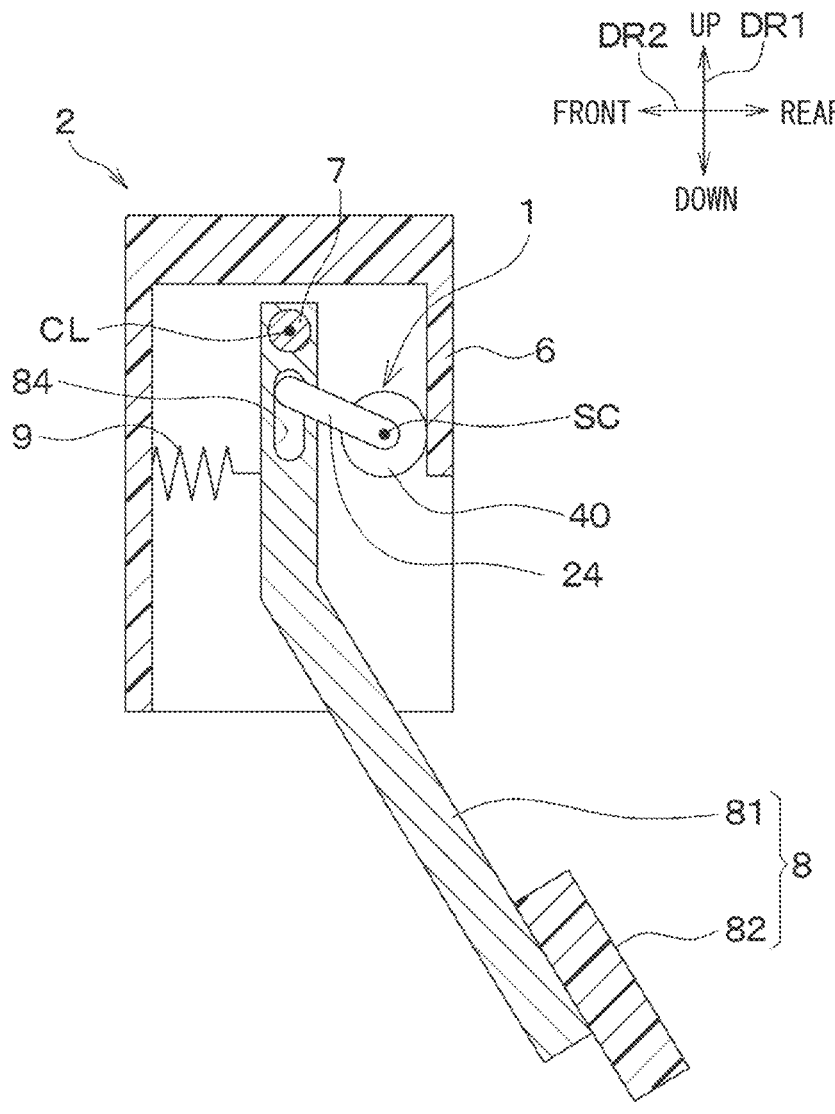
FIG. 25 is a cross-sectional view perpendicular to an axis of a shaft in a brake pedal device having an inductive sensor according to a tenth embodiment.
Figure 26:
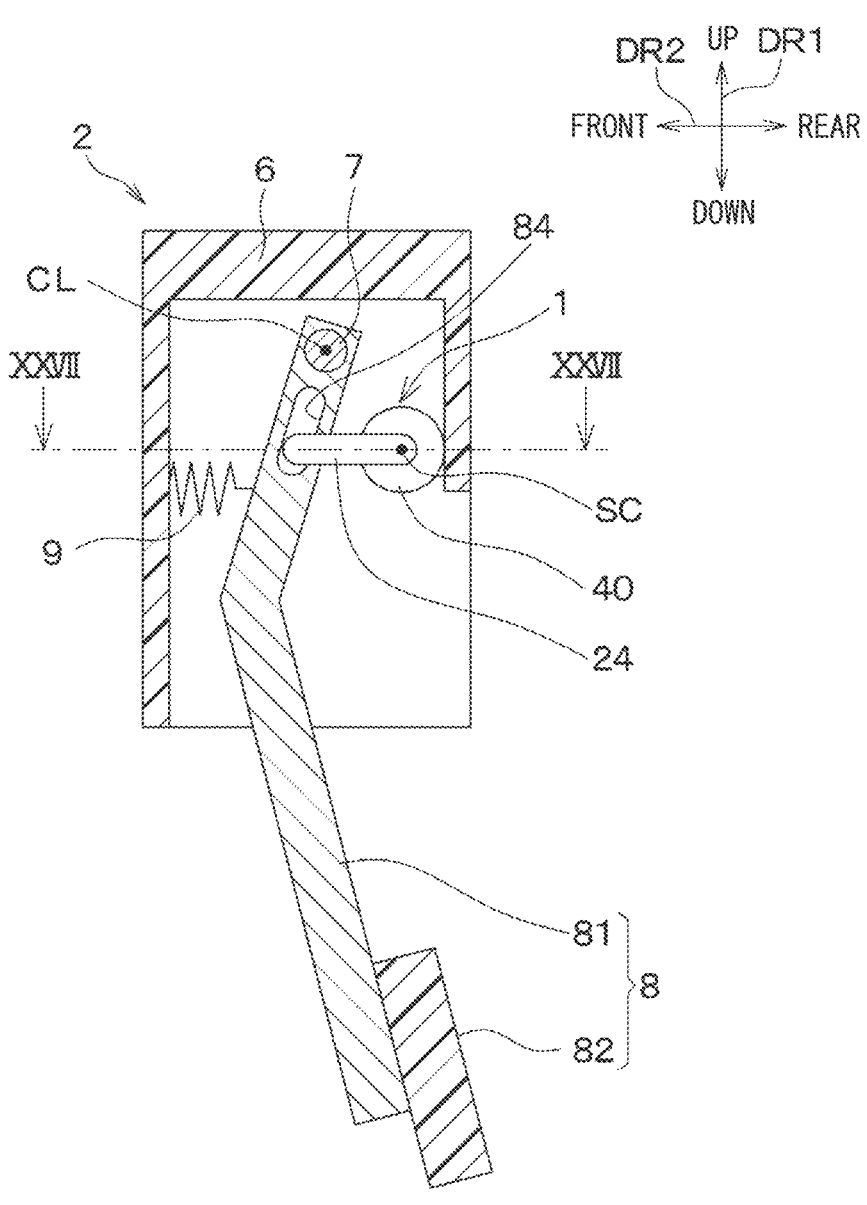
FIG. 26 is a cross-sectional view perpendicular to an axis of a shaft in a brake pedal device having an inductive sensor according to the tenth embodiment.
Figure 27:
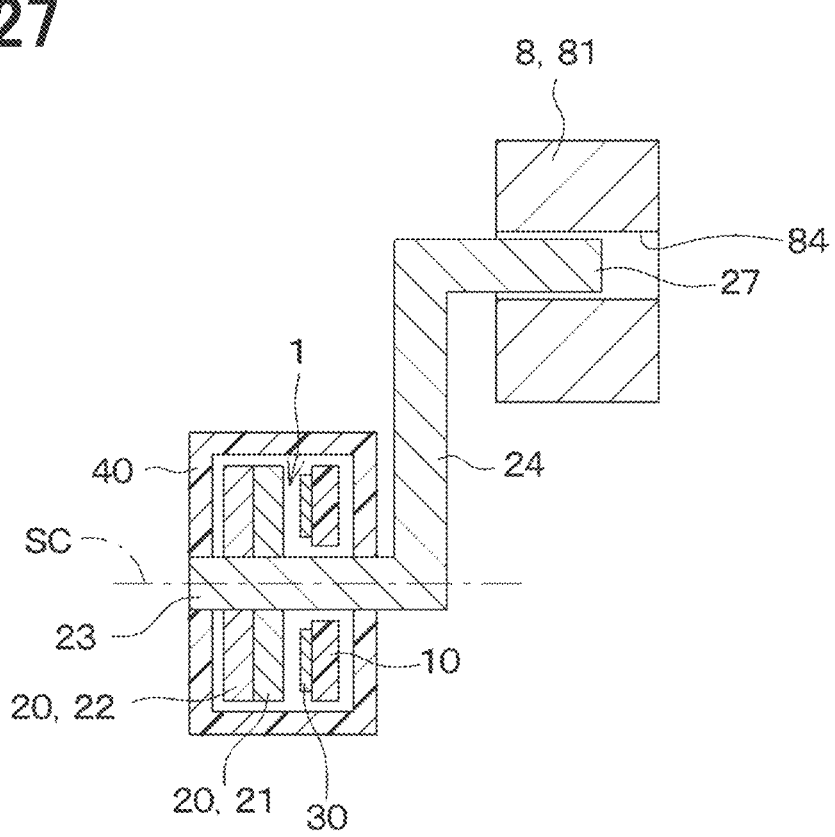
FIG. 27 is a cross-sectional view showing the inductive sensor and a brake pedal taken along a line XXVII-XXVII in FIG. 26.

As shown in FIGS. 25 to 27, the tenth embodiment illustrates an example in which the rotation axis CL of the shaft 7 of the brake pedal device 2 and a rotation axis SC of the multiple targets 20 of the inductive sensor 1 are at different positions. In the following description, the rotation axis SC of the target 20 is referred to as a "sensor axis SC."

An inductive sensor 1 includes, within a sensor case 40, multiple targets 20, and a circuit board 10 on which a transceiver coil 30, a transceiver circuit and the like are implemented. The sensor case 40 and a housing 6 may be formed integrally. Further, the targets 20, the transceiver coil 30, the circuit board 10, and the like provided in the inductive sensor 1 may have at least one of the configurations described in the first to ninth embodiments.

The multiple targets 20 are fixed to a sensor rotating shaft 23. The sensor rotating shaft 23 is rotatable about the sensor axis SC. A sensor arm 24 is fixed to the sensor rotating shaft 23. The sensor arm 24 extends in a direction perpendicular to the sensor axis SC. A connecting portion 27 is provided at one end of the sensor arm 24 opposite to the sensor rotation shaft 23. The connecting portion 27 is inserted into an elongated hole 84 provided in a part of the pedal arm 81. The sensor rotating shaft 23, the sensor arm 24 and the connecting portion 27 may be integrally formed.

With such a configuration, when the driver performs a pedaling operation on the brake pedal 8, the brake pedal 8 and the shaft 7 rotate about the axis CL. At such time, the motion of the pedal arm 81 is transmitted from the elongated hole 84 to the sensor rotating shaft 23 via the connecting portion 27, the sensor arm 24, and the multiple targets 20 rotate about the sensor axis SC. The inductive sensor 1 outputs a signal according to the position of the target 20 which operates in synchronization with the brake pedal 8.

As described above, the rotation axis CL of the shaft 7 of the brake pedal device 2 and the sensor axis SC of the inductive sensor 1 may be provided at different positions. The tenth embodiment can also achieve the same effects as the first to ninth embodiments described above. In addition, the configuration in which the rotation axis CL of the shaft 7 of the brake pedal device 2 and the sensor axis SC of the inductive sensor 1 are in different positions is not limited to the one exemplified in the tenth embodiment, but various configurations that apply a link mechanism and the like are adoptable.

Eleventh Embodiment

The eleventh embodiment will be described. The eleventh embodiment describes an example of a method for fixing multiple targets 20 in contrast to the first embodiment and the like.

Figure 28:
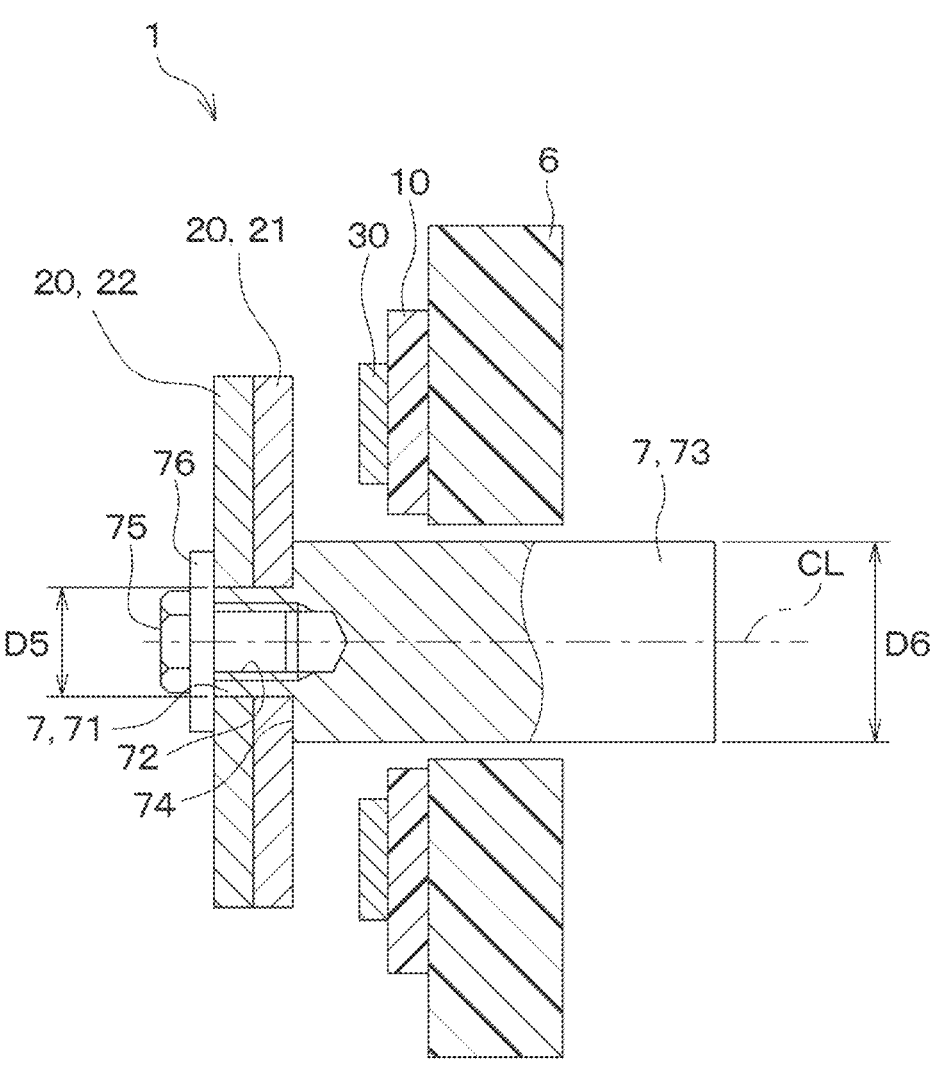
FIG. 28 is a cross-sectional view parallel to an axis of a shaft in an inductive sensor according to an eleventh embodiment.

As shown in FIG. 28, in the eleventh embodiment, multiple targets 20 are fixed to a shaft 7 as a detection object by using the same fixing member (for example, a bolt 75).

Specifically, a screw hole 72, which extends in the axial direction, is provided at an axial end 71 of the shaft 7. Further, an outer diameter D5 of the axial end 71 of the shaft 7 is smaller than an outer diameter D6 of a base portion 73 of the shaft 7. Therefore, a step 74 is provided at a position between the axial end 71 and the base portion 73 of the shaft 7. A first target 21 and a second target 22 are fitted to the axial end 71 of the shaft 7, and the step 74 abuts against a surface of the first target 21 opposite to the second target 22.

The bolt 75 as an example of a fixing member is screwed into a screw hole 72 of the shaft 7. The first target 21 and the second target 22 are fixed in a state in which they are pressed against the step 74 by a washer portion 76 provided on a head of the bolt 75. Although not shown, a mechanism for preventing relative rotation between the first target 21, the second target 22 and the shaft 7 may be provided as required. Thereby, the multiple targets 20 are fixed to the detection object (e.g., the shaft 7 or the brake pedal 8) to move in synchronization with the movement of the detection object.

The inductive sensor 1 and the brake pedal device 2 of the eleventh embodiment described above are configured such that the multiple targets 20 are fixed to the detection object by the same fixing member to move in synchronization with the movement of the detection object. Even with such a configuration, when one of the multiple targets 20 is damaged, deformed, falls off, or the like, it is possible to correctly detect the position of the detection object using another target 20 and the transceiver coil 30. Therefore, similar to the above-described first embodiment, the inductive sensor 1 of the eleventh embodiment can ensure redundancy in detecting the position of the detection object even if the target 20 is damaged, or the like.

In the eleventh embodiment, the bolt 75 is exemplified as the fixing member for fixing the multiple targets 20 to the shaft 7, but the present disclosure is not limited thereto. As a fixing member or a fixing method for fixing the multiple targets 20 to the shaft 7, various members and methods are usable, such as a fixing pin, caulking, snap fitting, press fitting, welding, or the like. It is also possible to use these materials and methods in combination. The method of fixing the multiple targets 20 and the detection object described in the eleventh embodiment is applicable to the first to seventeenth embodiments.

Twelfth Embodiment

The twelfth embodiment will be described. The twelfth embodiment also describes an example of a method for fixing multiple targets 20 in contrast to the first embodiment and the like.

Figure 29:
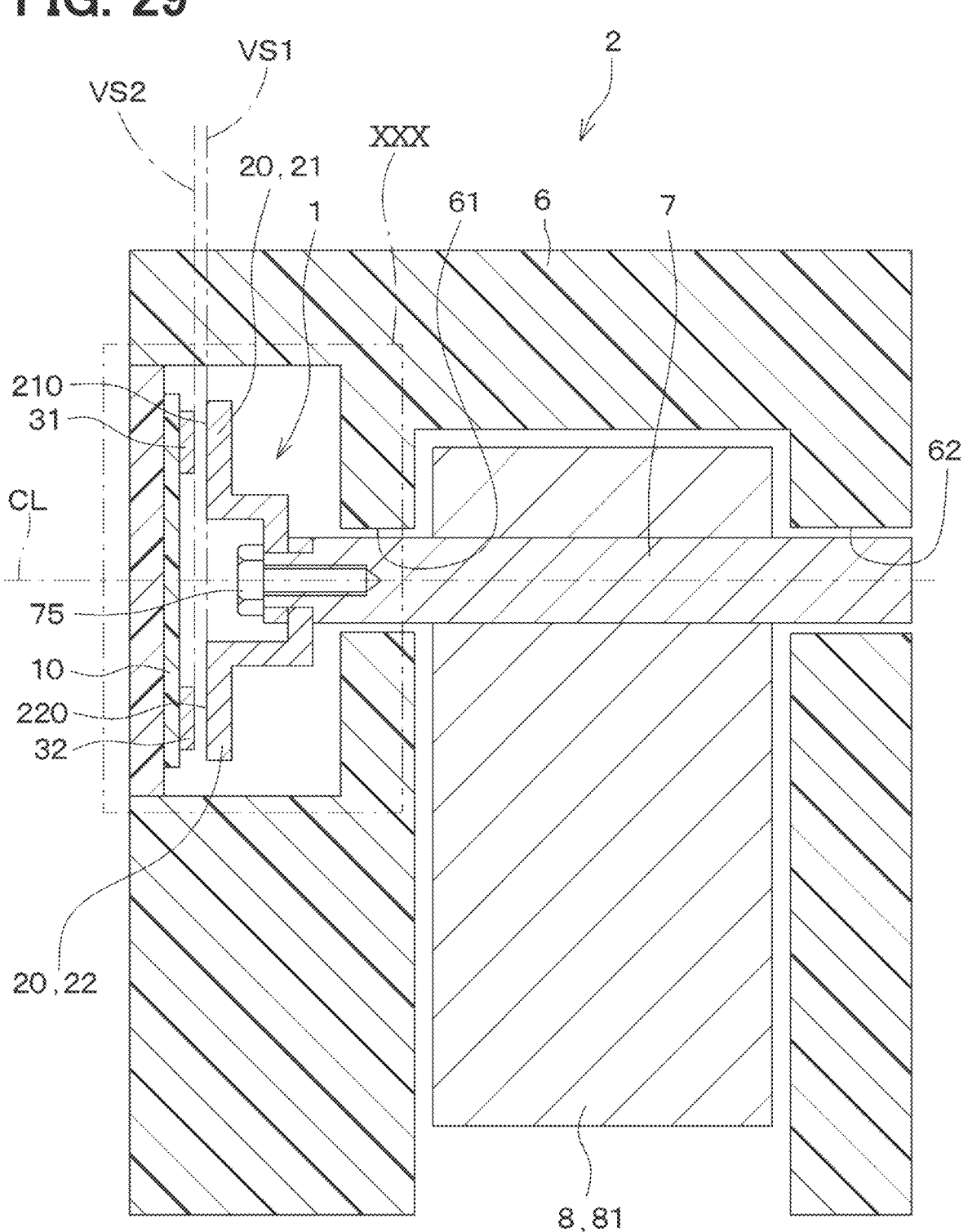
FIG. 29 is a cross-sectional view showing a portion corresponding to FIG. 4 in a brake pedal device having an inductive sensor according to a twelfth embodiment.
Figure 30:
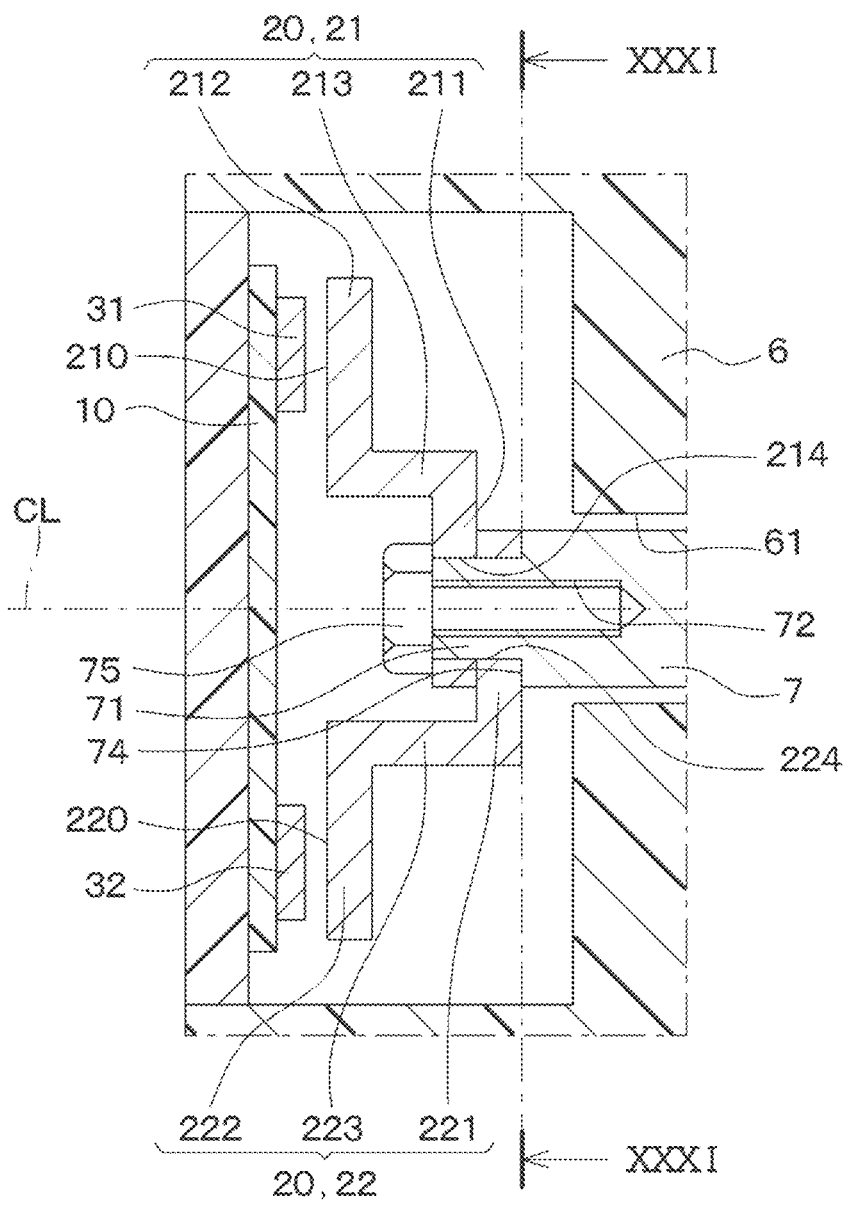
FIG. 30 is an enlarged view of an XXX portion of FIG. 29.
Figure 31:
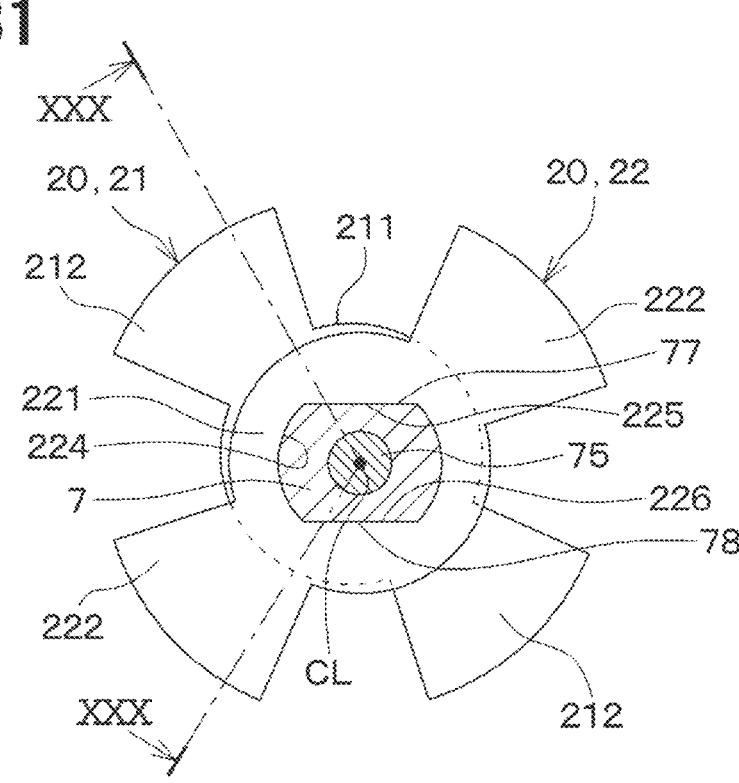
FIG. 31 is a cross-sectional view taken along a line XXXI-XXXI in FIG. 30.

As shown in FIGS. 29 to 31, in the twelfth embodiment, multiple targets 20 include a first target 21 and a second target 22. The first target 21 and the second target 22 each have cylinder portions 211, 221, arm portions 213, 223, and multiple blades 212, 222. The cylinder portions 211 and 221 are portions that surround an outer wall of a shaft 7 on the radial outside. The arm portions 213 and 223 are portions that extend from an outer periphery of the cylinder portions 211 and 221 toward a circuit board 10 in the axial direction. The multiple blades 212, 222 are portions that extend radially outward from the portions in the arm portions 213, 223 on a circuit board 10 side.

As shown in FIG. 30, both of the first target 21 and the second target 22 are fixed to the shaft 7 as a rotating body by using the same bolt 75. Specifically, an axial end 71 of the shaft 7 in the axial direction is inserted into a first hole 214 of the first target 21 and a second hole 224 of the second target 22. Further, a screw hole 72 extending in the axial direction is provided at the axial end 71 of the shaft 7. A bolt 75 is screwed into the screw hole 72 of the shaft 7. The first target 21 and the second target 22 are fixed in a state in which they are pressed against a step 74 provided on the shaft 7 by an axial force of the bolt 75.

As shown in FIG. 31, the first target 21 and the second target 22 are both restricted in their relative rotation with the shaft 7 by an anti-rotation structure. Specifically, the anti-rotation structure is composed of two second target side flat surfaces 225, 226 formed on an inner wall of the second hole 224 of the second target 22, and two shaft side flat surfaces 77, 78 provided on an outer wall of the shaft 7. In such manner, the anti-rotation structure restricts the relative rotation between the second target 22 and the shaft 7. In addition, although not shown in the drawing, the anti-rotation structure is also composed of two first target side flat surfaces formed on an inner wall of the first hole 214 of the first target 21, and two shaft side flat surfaces 77, 78 provided on an outer wall of the shaft 7. In such manner, the anti-rotation structure restricts relative rotation between the first target 21 and the shaft 7. Therefore, even if the bolt 75 gets loose, the anti-rotation structure can prevent the first target 21, the second target 22, and the shaft 7 from rotating relative to each other.

The multiple blades 212 of the first target 21 and the multiple blades 222 of the second target 22 are arranged at positions offset in the circumferential direction, in other words, at positions that do not overlap in the axial direction. Further, as shown in FIG. 29, the surface 210 of each of the multiple blades 212 of the first target 21 that faces a first transceiver coil 31 is arranged on a first imaginary plane VS1. Further, a surface 220 of each of the multiple blades 222 of the second target 22 that faces a second transceiver coil 32 is also arranged on the first imaginary plane VS1.

On the other hand, the first transceiver coil 31 and the second transceiver coil 32 are arranged on the circuit board 10 on a second imaginary plane VS2 that is parallel to the first imaginary plane VS1. In the present specification, "the first transceiver coil 31 and the second transceiver coil 32 are arranged on the second imaginary plane" includes a state in which the first transceiver coil 31, the second transceiver coil 32 and the second imaginary plane are exactly aligned, as well as a state in which they are slightly misaligned. An example of the slight misaligned state is a state in which the first transceiver coil 31, the second transceiver coil 32, and the second imaginary plane are slightly misaligned by the thickness of a coil wire and the thickness of a layer of the circuit board 10.

The inductive sensor 1 and the brake pedal device 2 of the twelfth embodiment described above have the following configuration and the resulting functions and effects in addition to the functions and effects described in the first embodiment and the like.

In the twelfth embodiment, both of the first target 21 and the second target 22 are fixed to the shaft 7 as a rotating body by using the same bolt 75. In such manner, the first target 21 and the second target 22 are easily fixed to the shaft 7 without requiring any special equipment.

In the twelfth embodiment, the inductive sensor 1 has an anti-rotation structure that restricts the relative rotation between the first target 21 and the shaft 7, and restricts the relative rotation between the second target 22 and the shaft 7. With such a configuration, even if the bolt 75 gets loose, the first target 21 and the second target 22 will not rotate relative to the shaft 7. Therefore, the inductive sensor 1 can continue to correctly detect the positions of the shaft 7 and the brake pedal 8 as the detection objects, thereby ensuring redundancy in the detection of the positions of the detection objects.

Thirteenth Embodiment

The thirteenth embodiment will be described. The thirteenth embodiment describes another specific example of the anti-rotation structure in contrast to the twelfth embodiment.

Figure 32:
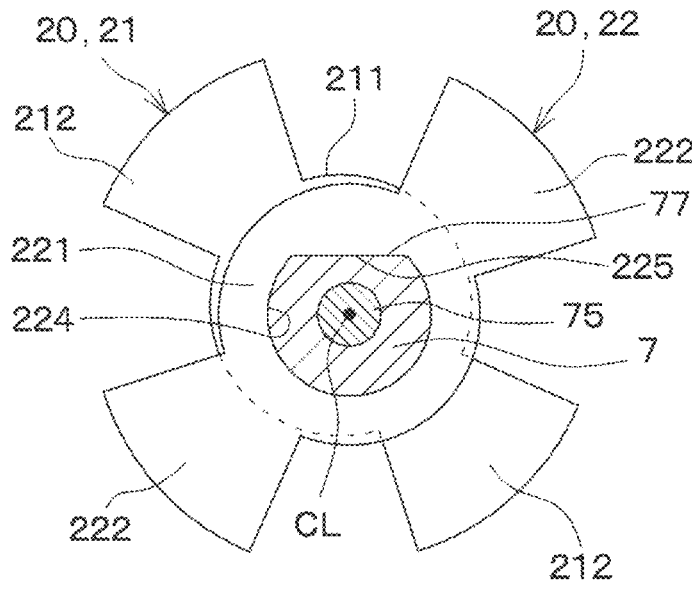
FIG. 32 is a cross-sectional view showing a portion corresponding to FIG. 31 in a brake pedal device having an inductive sensor according to a thirteenth embodiment.

As shown in FIG. 32, in the thirteenth embodiment as well, the relative rotation of both of a first target 21 and a second target 22 with respect to a shaft 7 is restricted by the anti-rotation structure. Specifically, the anti-rotation structure is composed of one second target side flat surface 225 formed on an inner wall of a second hole 224 of the second target 22, and one shaft side flat surface 77 provided on an outer wall of the shaft 7. In such manner, the anti-rotation structure restricts the relative rotation between the second target 22 and the shaft 7. Also, although not shown in the drawing, the anti-rotation structure is also composed of a first target side flat surface formed on an inner wall of a first hole 214 of the first target 21, and a shaft side flat surface 77 provided on an outer wall of the shaft 7. In such manner, the anti-rotation structure restricts relative rotation between the first target 21 and the shaft 7. Therefore, in the thirteenth embodiment, similar to the twelfth embodiment, even if the bolt 75 gets loose, relative rotation among the first target 21, the second target 22, and the shaft 7 is preventable.

Fourteenth Embodiment

The fourteenth embodiment will be described. The fourteenth embodiment also describes another specific example of the anti-rotation structure in contrast to the twelfth embodiment.

Figure 33:
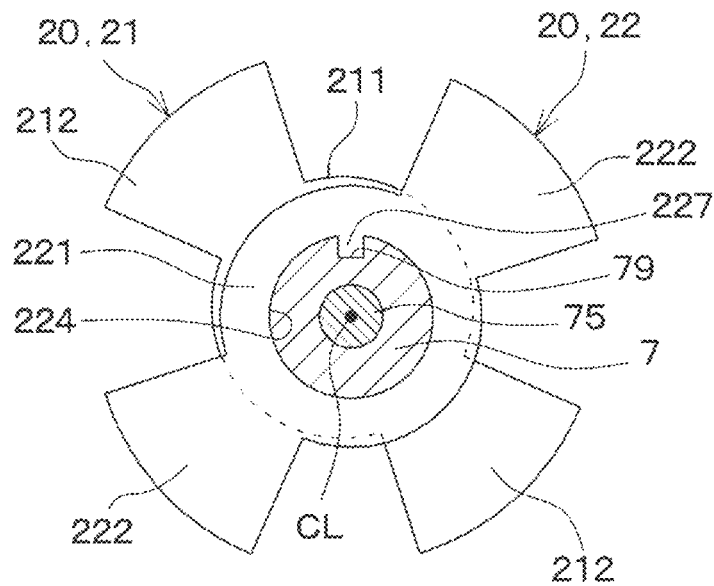
FIG. 33 is a cross-sectional view showing a portion corresponding to FIG. 31 in a brake pedal device having an inductive sensor according to a fourteenth embodiment.

As shown in FIG. 33, in the fourteenth embodiment as well, relative rotation of both of a first target 21 and a second target 22 with respect to a shaft 7 is restricted by the anti-rotation structure. Specifically, the anti-rotation structure is composed of a protrusion 227 protruding radially inward from an inner wall of a second hole 224 of the second target 22 and a recess 79 provided on an outer wall of the shaft 7. The protrusion 227 of the second target 22 fits into the recess 79 of the shaft 7. In such manner, the anti-rotation structure restricts relative rotation between the second target 22 and the shaft 7. In addition, although not shown in the drawing, the anti-rotation structure is also composed of a protrusion protruding radially inward from an inner wall of a first hole 214 of the first target 21 and the recess 79 provided on an outer wall of the shaft 7. The protrusion of the first target 21 fits into the recess 79 of the shaft 7. In such manner, the anti-rotation structure restricts relative rotation between the first target 21 and the shaft 7. Therefore, in the fourteenth embodiment, like the twelfth and thirteenth embodiments, even if the bolt 75 gets loose, relative rotation among the first target 21, the second target 22, and the shaft 7 is preventable.

Fifteenth Embodiment

The fifteenth embodiment will now be described. The fifteenth embodiment is different from the twelfth to fourteenth embodiments in that the method of fixing the multiple targets 20 is changed.

Figure 34:
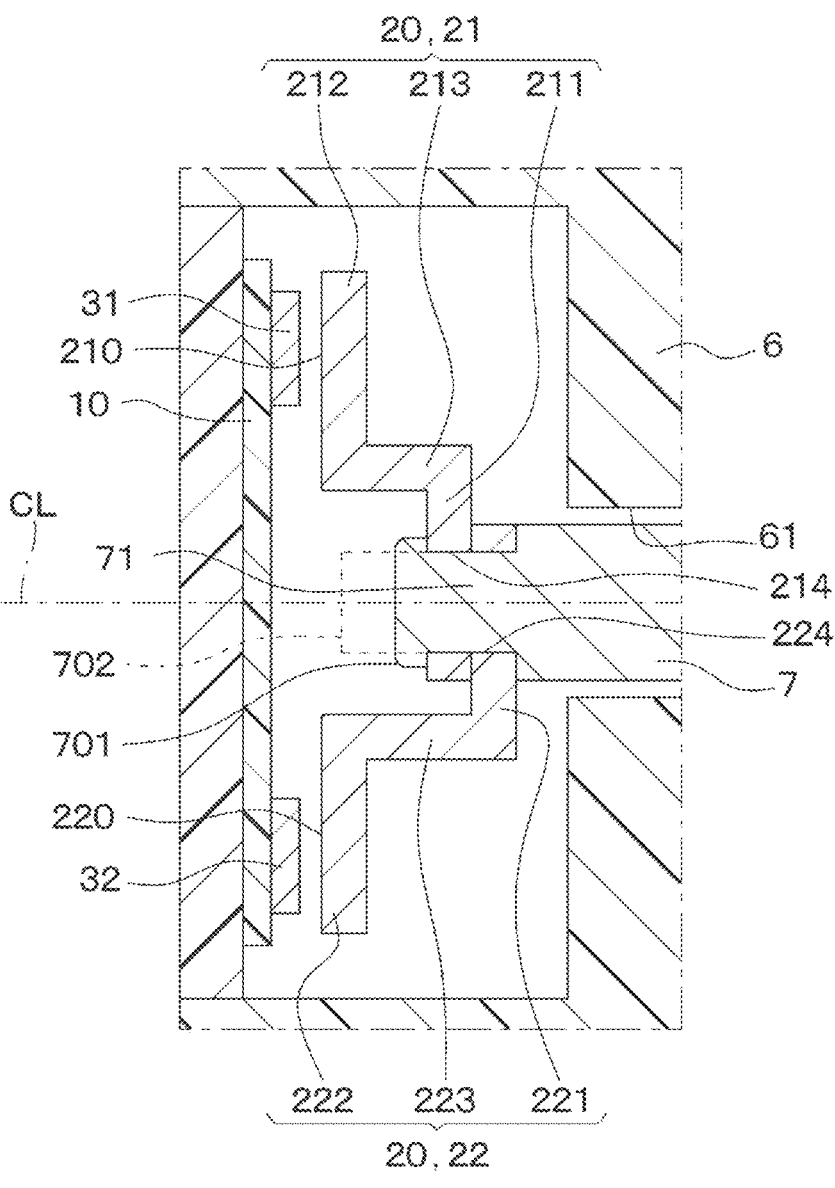
FIG. 34 is a cross-sectional view showing a portion corresponding to FIG. 30 in a brake pedal device having an inductive sensor according to a fifteenth embodiment.

As shown in FIG. 34, in the fifteenth embodiment, both a first target 21 and a second target 22 are fixed to a shaft 7 serving as a rotating body by caulking 701. Specifically, an end 71 in the axial direction of the shaft 7 has a shape shown by a dashed line 702 before being subjected to a caulking process. The portion indicated by the dashed line 702 is inserted into a first hole 214 of the first target 21 and a second hole 224 of the second target 22. Then, the portion indicated by the dashed line 702 is pressurized from the axial direction and crushed, thereby performing the caulking process. In such manner, the end 71 in the axial direction of the shaft 7 can fix the first target 21 and the second target 22 by caulking 701.

The fifteenth embodiment may also have the anti-rotation structures described in the twelfth to fourteenth embodiments.

The inductive sensor 1 and the brake pedal device 2 of the fifteenth embodiment described above have the following configuration and the resulting functions and effects in addition to the functions and effects described in the first embodiment and the like.

In the fifteenth embodiment, both the first target 21 and the second target 22 are fixed to the shaft 7 by caulking 701. In such manner, the component cost of bolts 75 is reducible compared to a configuration in which the first target 21 and the second target 22 are fixed to the shaft 7 by the bolts 75. Further, the height of the head of the caulking 701 is generally lower than the height of the head of the bolt 75, thereby an amount of bending of each of the targets 20 (i.e., the length of the arms 213, 223) required to position a detection surface of the target 20 on a first imaginary plane VS1 shown in FIG. 29 is reducible. Therefore, the size of the inductive sensor 1 in the axial direction is reducible. The detection surface of the target 20 is (a) a surface 210 of multiple blades 212 of the first target 21 that faces a first transceiver coil 31, and (b) a surface 220 of multiple blades 222 of the second target 22 that faces a second transceiver coil 32.

Sixteenth Embodiment

The sixteenth embodiment will be described. The sixteenth embodiment is different from the fifth and twelfth to fifteenth embodiments in that the size of the transceiver coil 30 is changed.

Figure 35:
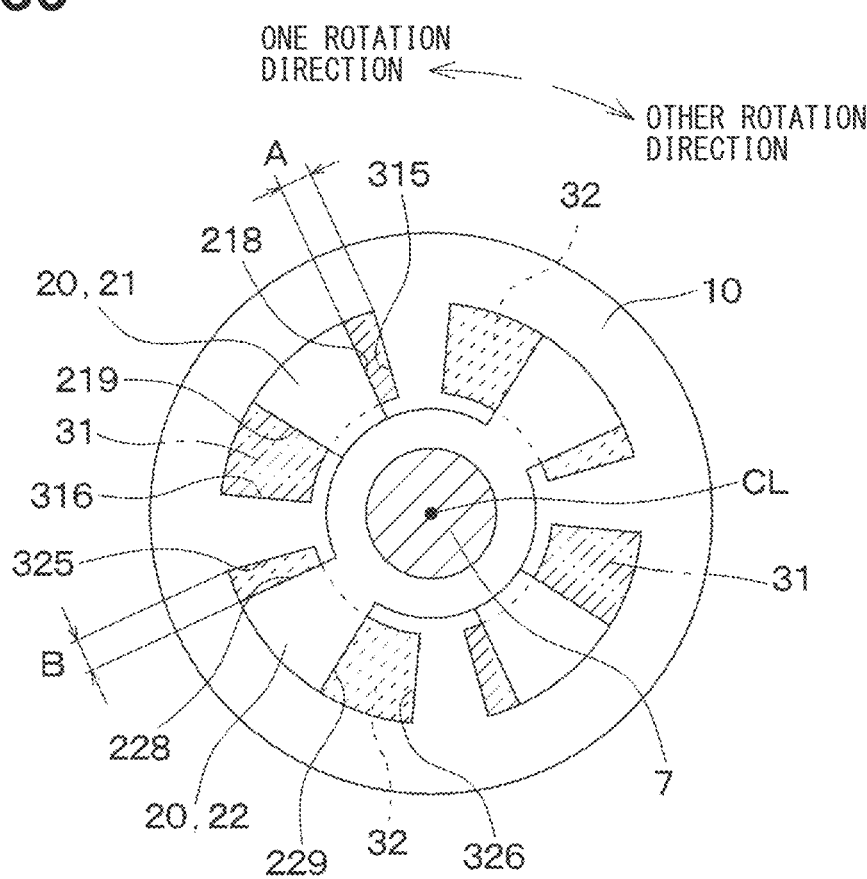
FIG. 35 is a cross-sectional view showing a portion corresponding to FIG. 31 in a brake pedal device having an inductive sensor of a sixteenth embodiment, and shows a state of the inductive sensor when a brake pedal is in an initial position.

FIG. 35 shows a state of an inductive sensor 1 when centers of bearings 61, 62 of a housing 6 and an axis CL of a shaft 7 are in the same position, and no pedaling force of a driver is being applied to a brake pedal 8, i.e., a state of when the brake pedal 8 is in its initial position. In such state, an angle of a target 20 with respect to a circuit board 10 is set to, for example, 0 degree.

Figure 36:
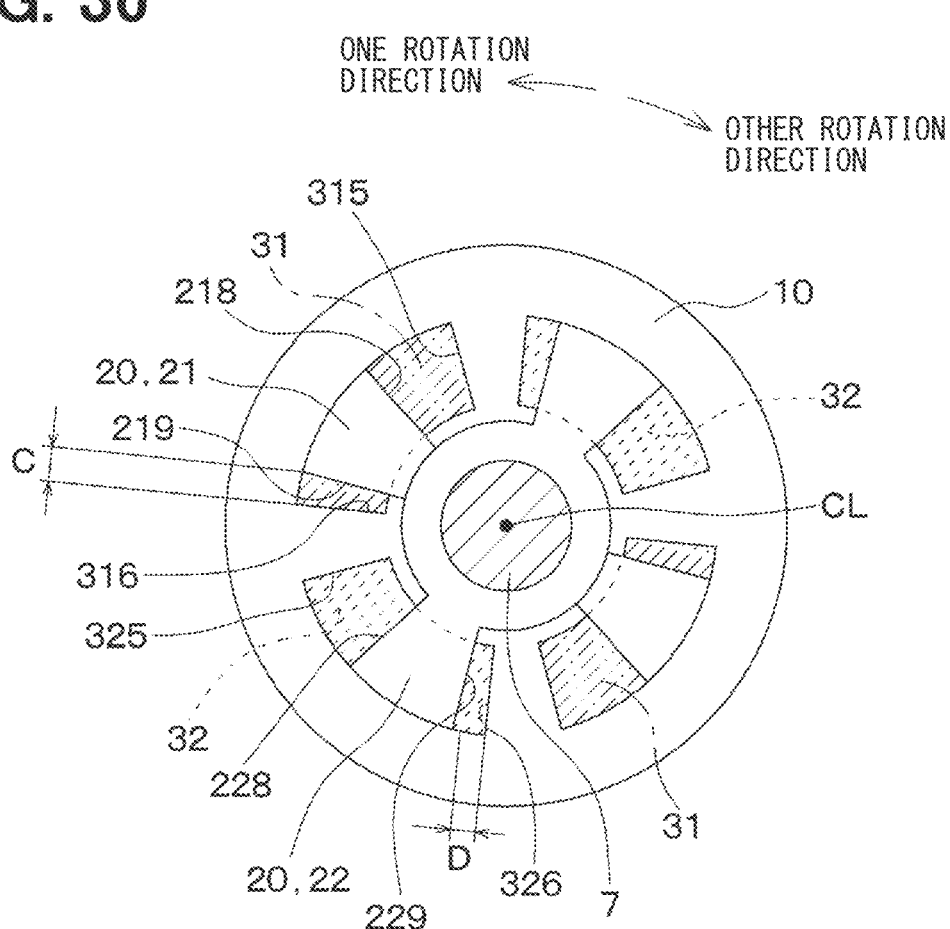
FIG. 36 is a cross-sectional view showing a portion corresponding to FIG. 31 in a brake pedal device having an inductive sensor of the sixteenth embodiment, and shows a state of the inductive sensor when the brake pedal is in a maximum depression position.

On the other hand, FIG. 36 shows a state of the inductive sensor 1 when the centers of the bearings 61, 62 of the housing 6 and the axis CL of the shaft 7 are in the same position, and the brake pedal 8 is fully pedaled, i.e., a state of when the brake pedal 8 is in the maximum depression position. In such state, the angle of the target 20 with respect to the circuit board 10 is set to, for example, X degrees. Therefore, when the brake pedal 8 rotates from the initial position to the maximum depression position, the target 20 rotates in a range from 0 degree to X degrees.

In the following description, when the pedaling force of a driver on the brake pedal 8 increases, the direction in which the target 20 rotates relative to the circuit board 10 together with the pedaling operation of the brake pedal 8 is referred to as "one rotation direction." On the other hand, when the pedaling force of a driver on the brake pedal 8 is reduced or released, the direction in which the target 20 rotates relative to the circuit board 10 together with a return movement of the brake pedal 8 is referred to as an "other rotation direction."

In FIGS. 35 and 36, an area on the circuit board 10 where a first transceiver coil 31 is implemented is shown as hatched with one-dot chain lines, although it is not a cross-section, and an area where a second transceiver coil 32 is implemented is shown as hatched with dashed lines, although it is not a cross-section. It should be noted that the one-dot chain and dashed line hatching are not applied to areas where a transceiver coil 30 and the target 20 overlap in the axial direction. The same applies to the seventeenth embodiment, the second comparative example, and the third comparative example, which will be described later.

As shown in FIGS. 35 and 36, in the sixteenth embodiment, a range in which the first transceiver coil 31 is implemented on the circuit board 10 is larger in one and the other rotation directions of the first target 21 than a rotation range of the first target 21 (i.e., 0 degree to X degrees). Further, a range in which the second transceiver coil 32 is implemented on the circuit board 10 is also larger in one and the other rotation directions of the second target 22 than the rotation range of the second target 22 (i.e., 0 degree to X degrees).

Specifically, as shown in FIG. 35, when the first target 21 is at 0 degree, a distance A between an end 218 of the first target 21 in the other rotation direction and an end 315 of the first transceiver coil 31 in the other rotation direction is greater than a predetermined distance D1. The predetermined distance D1 is a distance that the first target 21 may move relative to the circuit board 10 due to play between bearings 61 and 62 of the housing 6 and the shaft 7. Further, when the second target 22 is positioned at 0 degree, a distance B between an end 228 of the second target 22 in the other rotation direction and an end 325 of the second transceiver coil 32 in the other rotation direction is greater than a predetermined distance D2. The predetermined distance D2 is a distance that the second target 22 may move relative to the circuit board 10 due to play between the bearings 61 and 62 of the housing 6 and the shaft 7.

Also, as shown in FIG. 36, when the first target 21 is at X degrees, a distance C between an end 219 of the first target 21 in one rotation direction and an end 316 of the first transceiver coil 31 in one rotation direction is greater than a predetermined distance D3. The predetermined distance D3 is a distance that the first target 21 may move relative to the circuit board 10 due to play between the bearings 61 and 62 of the housing 6 and the shaft 7. Further, when the second target 22 is at X degrees, a distance D between an end 229 of the second target 22 in one rotation direction and an end 326 of the second transceiver coil 32 in one rotation direction is greater than a predetermined distance D4. The predetermined distance D4 is a distance that the second target 22 may move relative to the circuit board 10 due to play between the bearings 61, 62 of the housing 6 and the shaft 7.

Here, for comparison with the configuration described in the above-described sixteenth embodiment, an inductive sensor and a brake pedal device of a second comparative example will be described.

Figure 37:
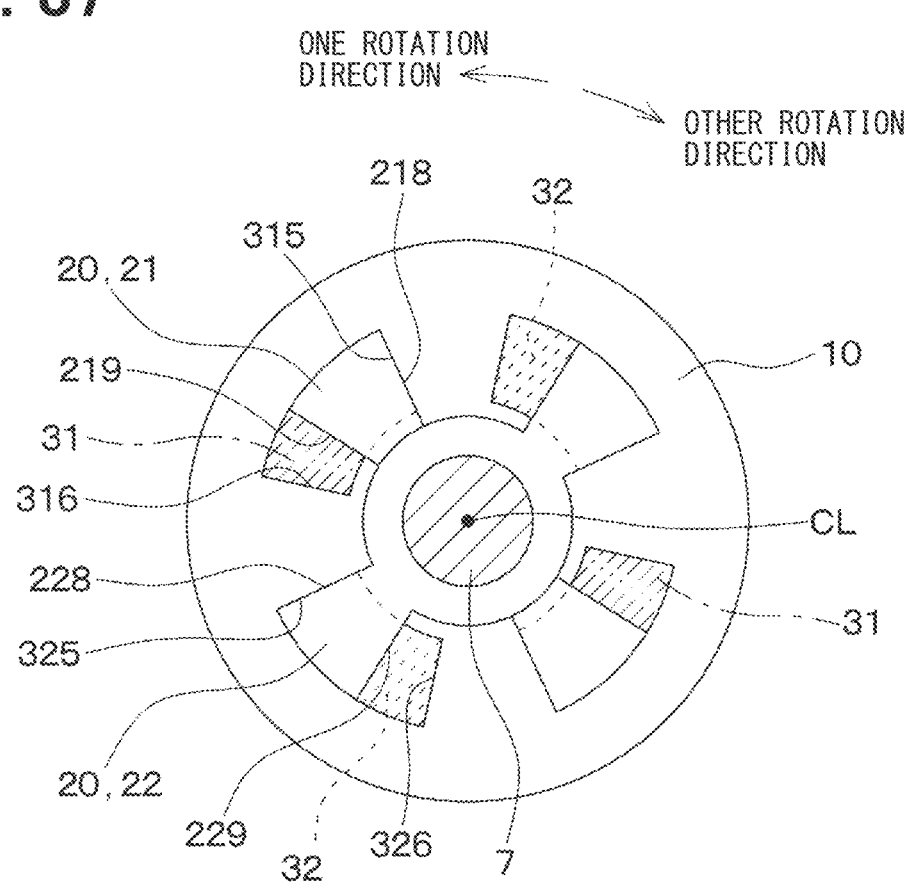
FIG. 37 is a cross-sectional view showing a portion corresponding to FIG. 31 in a brake pedal device having an inductive sensor of a second comparative example, showing a state of the inductive sensor when the brake pedal is in the initial position.

FIG. 37 shows a state of an inductive sensor when the centers of the bearings 61, 62 of the housing 6 and the axis CL of the shaft 7 are at the same position and the brake pedal 8 is in the initial position. As shown in FIG. 37, in the second comparative example, when the first target 21 is at 0 degree, the end 218 of the first target 21 in the other rotation direction and the end 315 of the first transceiver coil 31 in the other rotation direction are in an overlapping position when viewed from the axial direction. Further, when the second target 22 is at 0 degree, the end 228 of the second target 22 in the other rotation direction and the end 325 of the second transceiver coil 32 in the other rotation direction are in an overlapping position when viewed from the axial direction.

In the second comparative example, a case where (a) the centers of the bearings 61, 62 of the housing 6 and the axis CL of the shaft 7 are at the same position and (b) the first target 21 and the second target 22 are at X degrees is omitted from the illustration. In such case, in the second comparative example, the end 219 of the first target 21 in one rotation direction and the end 316 of the first transceiver coil 31 in one rotation direction are in an overlapping position when viewed from the axial direction. Further, in such case, in the second comparative example, the end 229 of the second target 22 in one rotation direction and the end 326 of the second transceiver coil 32 in one rotation direction are in an overlapping position when viewed from the axial direction.

Figure 38:
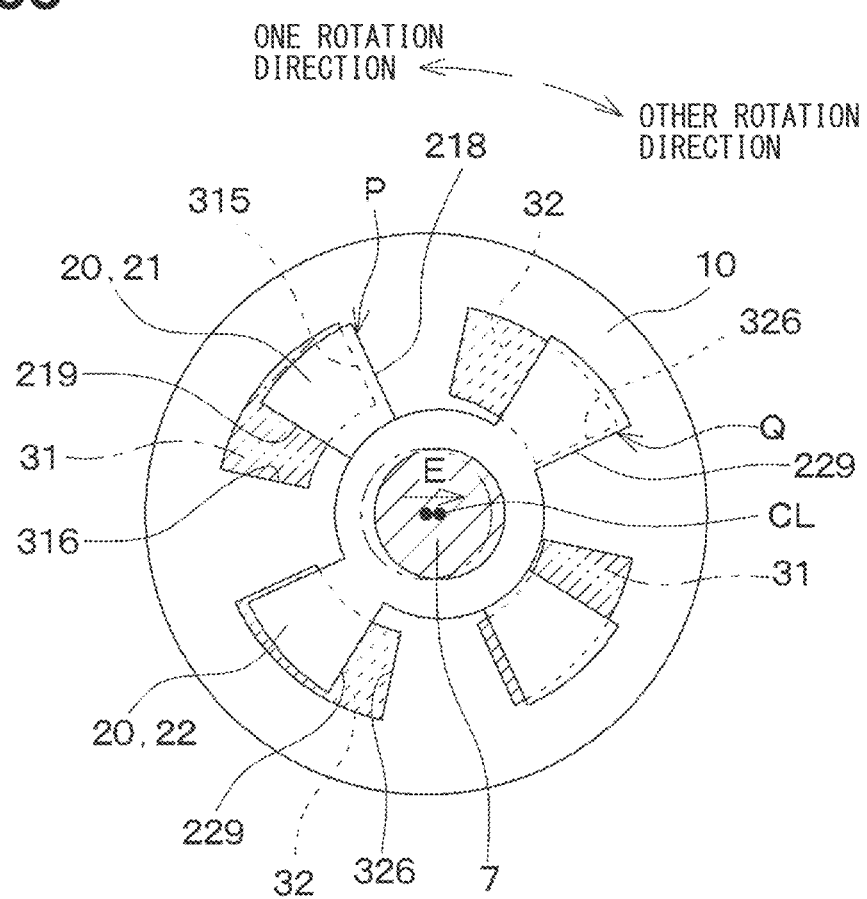
FIG. 38 is a cross-sectional view showing a portion corresponding to FIG. 31 in a brake pedal device having an inductive sensor of the second comparative example, showing a state in which a shaft is eccentric when the brake pedal is in the initial position.

FIG. 38 shows a state in the second comparative example where, when the brake pedal 8 is in the initial position, the shaft 7 becomes eccentric due to play between the bearings 61, 62 of the housing 6 and the shaft 7, causing the target 20 to move in the direction indicated by an arrow E relative to the circuit board 10. In the second comparative example, a portion P of the first target 21 at the upper left in FIG. 38 is outside an implementation range of the first transceiver coil 31. Further, a portion Q of the second target 22 at the upper right in FIG. 38 is also outside the implementation range of the second transceiver coil 32. Therefore, in the second comparative example, if the shaft 7 becomes eccentric when the brake pedal 8 is in the initial position, an area size of overlap between the first target 21 and the first transceiver coil 31 in the axial direction changes significantly. In addition, an area size of overlap between the second target 22 and the second transceiver coil 32 in the axial direction also changes significantly. Therefore, the amplitude of the signal output from the inductive sensor changes significantly.

Although not shown in the drawing, in the second comparative example, even if the shaft 7 becomes eccentric when the brake pedal 8 is in the maximum depression position, the area size of overlap between the first target 21 and the first transceiver coil 31 in the axial direction changes significantly. In addition, an area size of overlap between the second target 22 and the second transceiver coil 32 in the axial direction also changes significantly. Therefore, the amplitude of the signal output from the inductive sensor changes significantly.

Compared to the above-mentioned second comparative example, the inductive sensor 1 and brake pedal device 2 of the sixteenth embodiment have the following configuration and the resulting effects in addition to the effects described in the first embodiment, and the like.

In the sixteenth embodiment, the range in which the first transceiver coil 31 is implemented on the circuit board 10 is larger than the movable range of the first target 21 in one and the other rotation directions of the first target 21. Further, the range in which the second transceiver coil 32 is implemented on the circuit board 10 is larger than the movable range of the second target 22 in one and the other rotation directions of the second target 22. According to the above, even if the first target 21 and the second target 22 become eccentric with respect to the circuit board 10, for example, due to play between the bearings 61, 62 of the housing 6 and the shaft 7, the first target 21 is always positioned within the range of the first transceiver coil 31. Further, the second target 22 is always positioned within the range of the second transceiver coil 32. Therefore, the area size of overlap between the first transceiver coil 31 and the first target 21 in the axial direction does not change significantly due to eccentricity between the first target 21 and the second target 22. Further, the area size of overlap between the second transceiver coil 32 and the second target 22 in the axial direction does not change significantly. Therefore, the amplitude of the signal output from the inductive sensor 1 does not change significantly.

Seventeenth Embodiment

The seventeenth embodiment will be described. The seventeenth embodiment is different from the fifth and twelfth to sixteenth embodiments in that the size of the target 20 is changed.

Figure 39:
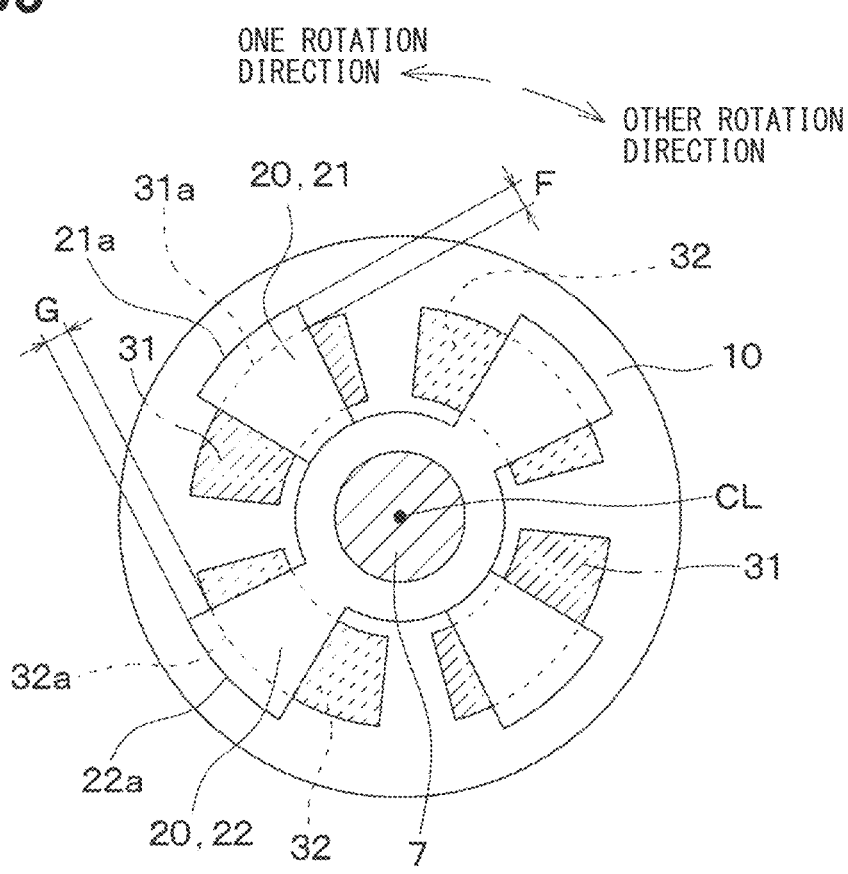
FIG. 39 is a cross-sectional view showing a portion corresponding to FIG. 31 in a brake pedal device having an inductive sensor according to a seventeenth embodiment, showing a state of an inductive sensor when a brake pedal is in an initial position.

FIG. 39 shows a state of an inductive sensor 1 when the centers of bearings 61, 62 of a housing 6 and an axis CL of a shaft 7 are aligned at the same position and a brake pedal 8 is in the initial position. As shown in FIG. 39, in the seventeenth embodiment, a first target 21 is larger radially outward than the range in which a first transceiver coil 31 is implemented on a circuit board 10. Further, a second target 22 is larger radially outward than the range in which a second transceiver coil 32 is implemented on the circuit board 10.

Specifically, a distance F between an end 21a of the first target 21 on radial outside and an end 31a of the first transceiver coil 31 on radial outside is greater than a predetermined distance D7. The predetermined distance D7 is a distance that the first target 21 may move relative to the circuit board 10 due to play between bearings 61, 62 of the housing 6 and the shaft 7. Further, a distance G between an end 22a of the second target 22 on radial outside and an end 32a of the second transceiver coil 32 on radial outside is greater than a predetermined distance. The predetermined distance mentioned above is a distance that the second target 22 may move relative to the circuit board 10 due to play between the bearings 61 and 62 of the housing 6 and the shaft 7.

Figure 40:
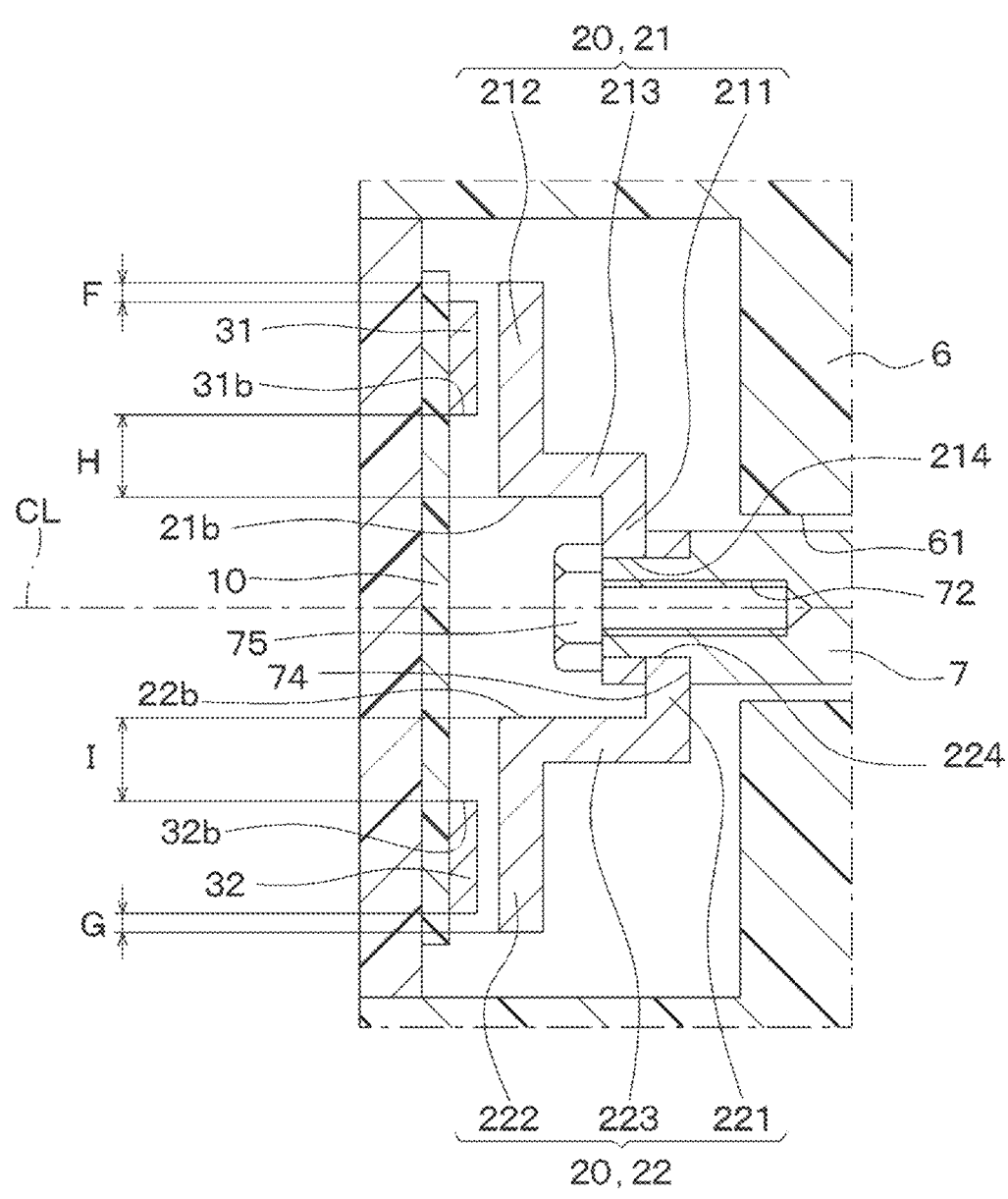
FIG. 40 is a cross-sectional view showing a portion corresponding to FIG. 30 in a brake pedal device having the inductive sensor according to the seventeenth embodiment.

Further, as shown in FIG. 40, in the seventeenth embodiment, blades 212 of the first target 21 are larger on radial inside than the range in which the first transceiver coil 31 is implemented on the circuit board 10. Further, blade 222 of the second target is larger on radial inside than the range in which the second transceiver coil 32 is implemented on the circuit board 10.

Specifically, a distance H between an end 21b of the blades 212 of the first target 21 on radial inside and an end 31b of the first transceiver coil 31 on radial inside is greater than a predetermined distance D8. The predetermined distance D8 is a distance that the first target 21 may move relative to the circuit board 10 due to play between the bearings 61 and 62 of the housing 6 and the shaft 7. Further, a distance I between an end 22b of the blades 222 of the second target 22 on radial inside and an end 32b of the second transceiver coil 32 on radial inside is greater than a predetermined distance D9. The predetermined distance D 9 is a distance that the second target 22 may move relative to the circuit board 10 due to play between the bearings 61, 62 of the housing 6 and the shaft 7.

Here, for comparison with the configuration described in the above-described seventeenth embodiment, an inductive sensor and a brake pedal device of a third comparative example will be described.

Figure 41:
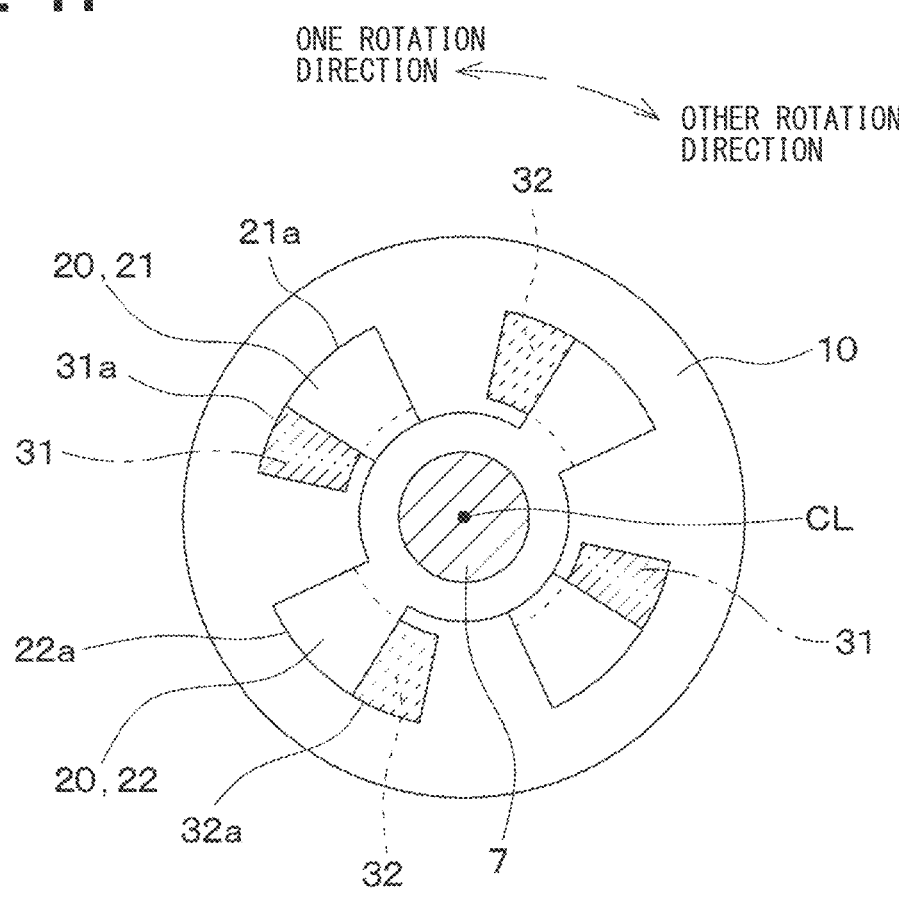
FIG. 41 is a cross-sectional view showing a portion corresponding to FIG. 31 in a brake pedal device having an inductive sensor of a third comparative example, showing a state of an inductive sensor when a brake pedal is in an initial position.

FIG. 41 shows a state of an inductive sensor when the centers of the bearings 61, 62 of the housing 6 and the axis CL of the shaft 7 are at the same position and the brake pedal 8 is in the initial position. As shown in FIG. 41, in the third comparative example, an end 21a of the first target 21 on radial inside and an end 31a of the first transceiver coil 31 on radial inside are in an overlapping position when viewed from the axial direction. Further, an end 22a of the second target 22 on radial outside and an end 32a of the second transceiver coil 32 on radial outside are in an overlapping position when viewed from the axial direction.

Figure 42:
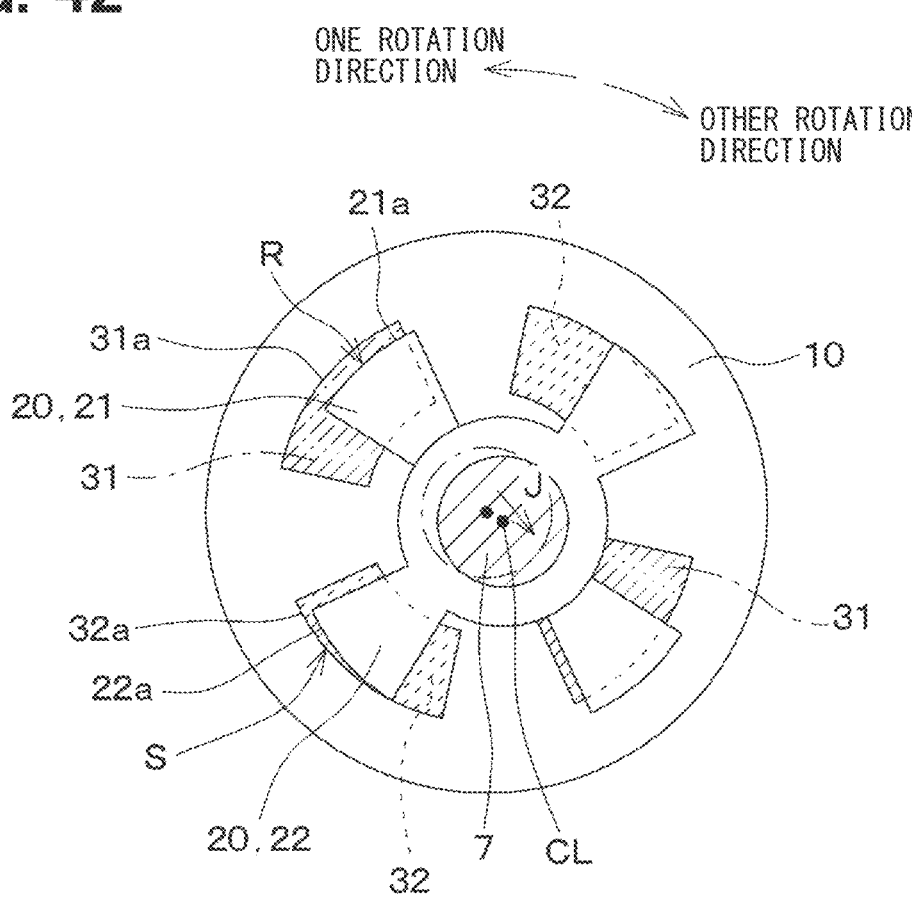
FIG. 42 is a cross-sectional view showing a portion corresponding to FIG. 31 in a brake pedal device having an inductive sensor of the third comparative example, showing a state in which a shaft is eccentric when the brake pedal is in the initial position.

FIG. 42 shows a state in which the shaft 7 has become eccentric due to play between the bearings 61 and 62 of the housing 6 and the shaft 7, causing the target 20 to move in the direction indicated by an arrow J relative to the circuit board 10. In the third comparative example, a portion R of the first target 21 at the upper left in FIG. 42 is outside the implementation range of the first transceiver coil 31. Further, a portion S of the second target 22 at the lower left in FIG. 42 is also outside the implementation range of the second transceiver coil 32. Therefore, in the third comparative example, when the shaft 7 is eccentric, an area size of overlap between the first target 21 and the first transceiver coil 31 in the axial direction changes significantly. In addition, an area size of overlap between the second target 22 and the second transceiver coil 32 in the axial direction also changes significantly. Therefore, the amplitude of the signal output from the inductive sensor changes significantly.

Compared to the above-mentioned third comparative example, the inductive sensor 1 and brake pedal device 2 of the seventeenth embodiment have the following configuration and the resulting effects in addition to the effects described in the first embodiment, and the like.

In the seventeenth embodiment, the first target 21 is larger on the radial outside and the radial inside than the range in which the first transceiver coil 31 is implemented on the circuit board 10. Further, the second target 22 is larger on the radial outside and the radial inside than the range in which the second transceiver coil 32 is implemented on the circuit board 10. In such manner, even if the first target 21 and the second target 22 become eccentric with respect to the circuit board 10 due to, for example, play between the bearings 61, 62 of the housing 6 and the shaft, the first target 21 is always positioned within the range of the first transceiver coil 31. Further, the second target 22 is always positioned within the range of the second transceiver coil 32. Therefore, the area size of overlap between the first transceiver coil 31 and the first target 21 in the axial direction does not change significantly due to eccentricity between the first target 21 and the second target 22. Further, the area size of overlap between the second transceiver coil 32 and the second target 22 in the axial direction does not change significantly. Therefore, the amplitude of the signal output from the inductive sensor 1 does not change significantly.

Other Embodiments (1) In each of the above embodiments, the inductive sensor 1 has been described as being applied to the brake pedal device 2, but the present disclosure is not limited thereto, and the inductive sensor 1 can be used for various applications in which a rotating body and a movable body serve as detection objects.

(2) In each of the above embodiments, the brake pedal device 2 to which the inductive sensor 1 is applied is a so-called pendant type. However, the present disclosure is not limited thereto, and the present disclosure may be applicable to, for example, a so-called organ type. The pendant type means that, when mounted on a vehicle, a portion of the brake pedal that is operated by a foot of a driver is arranged below the rotation axis CL in the vertical direction. The organ type is a type in which, when mounted on a vehicle, a portion of the brake pedal which is operated by a foot of a driver is arranged above the rotation axis CL in the vertical direction.

(3) In each of the above embodiments, the brake pedal device 2 to which the inductive sensor 1 is applied is described as being used in a complete brake-by-wire system 5. However, the present disclosure is not limited thereto. The brake pedal device 2 can also be used in a brake-by-wire system 5 in which the components of a brake mechanism 4 are mechanically connected to the brake pedal, and an ECU 3 drives the brake mechanism 4 based on the output signal of an inductive sensor 1. A component of the brake mechanism 4 corresponds to, for example, a master cylinder.

(4) In each of the above embodiments, the inductive sensor 1 is described as detecting the positions (specifically, the rotation angle) of the shaft 7 and the brake pedal 8. However, the present disclosure is not limited to the above. The inductive sensor 1 may detect, for example, a stroke amount of a brake pedal 8. Alternatively, the inductive sensor 1 may detect an amount of movement of the reaction force generating mechanism 9.

(5) In each of the above embodiments, the inductive sensor 1 has been described as having two targets 20. However, the present disclosure is not limited thereto, and the inductive sensor 1 may have three or more targets 20. Further, in the ninth embodiment, the inductive sensor 1 has been described as having multiple circuit boards 11 and 12, but the present disclosure is not limited thereto and may have three or more circuit boards 10.

(6) In the above-described twelfth to fourteenth embodiments, specific examples of the anti-rotation structure are shown, but the anti-rotation structure is not limited to these, and various configurations can be adopted. For example, the anti-rotation structure may be such that the first hole 214 and the second hole 224 of the target 20 are not circular when viewed from the axial direction, i.e., non-circular, and the outer wall of the shaft 7 is fitted into the non-circular shape.

The present disclosure is not limited to the above-described embodiments, and can be appropriately modified. The above-described embodiments and a part thereof are not irrelevant to each other, and can be appropriately combined with each other unless the combination is obviously impossible. Further, individual elements or features of a particular embodiment are not necessarily essential unless it is specifically stated that the elements or the features are essential in the foregoing description, or unless the elements or the features are obviously essential in principle. Further, in each of the embodiments described above, when numerical values such as the number, numerical value, quantity, range, and the like of the constituent elements of the embodiment are referred to, except in case where the numerical values are expressly essential in particular, or in case where the numerical values are obviously limited to a specific number in principle, and the like, the present disclosure is not limited to the specific number. A shape, positional relationship or the like of a structural element, which is referred to in the embodiments described above, is not limited to the described shape, positional relationship or the like, unless it is specifically described or obviously necessary to be limited in principle.

The aspects of the present disclosure are shown as follows:

First Aspect

An inductive sensor is for detecting a position of a detection object relative to a fixed body (6), and the detection object is either (i) a rotating body (7) rotatably provided about a predetermined axis (CL) relative to the fixed body (6) or (ii) a movable body (8) moving in accordance with a movement of the rotating body. The inductive sensor includes:

a circuit board (10, 11, 12) fixed to the fixed body, the circuit board being implemented with a transceiver coil (30, 31, 32) including a transmitter coil and a receiver coil, and a transceiver circuit (35) that supplies a high frequency wave to the transmitter coil and outputs a signal corresponding to a change in inductance of the receiver coil; and multiple targets (20, 21, 22) configured to include a conductor (25) and to move in synchronization with a movement of the detection object.

Second Aspect

In the inductive sensor according to the first aspect, the multiple targets include at least a first target (21) and a second target (22), and the transceiver coil has at least (i) a first transceiver coil (31) that outputs a detection value corresponding to a position of the first target and (ii) a second transceiver coil (32) that outputs a detection value corresponding to a position of the second target.

Third Aspect

In the inductive sensor according to the second aspect, a distance (D3) between the first target and the first transceiver coil is equal to a distance (D4) between the second target and the second transceiver coil.

Fourth Aspect

In the inductive sensor according to the second or third aspect, the first transceiver coil is implemented on one surface of the circuit board made of one piece, the second transceiver coil is implemented on an another surface of the circuit board, and the first target is arranged on one side of the circuit board in a plate thickness direction, and the second target is arranged on an another side of the circuit board in the plate thickness direction.

Fifth Aspect

In the inductive sensor according to the second or third aspect, a surface (210) of the first target facing the first transceiver coil and a surface (220) of the second target facing the second transceiver coil are arranged on a first virtual plane (VS1), and the first transceiver coil and the second transceiver coil provided in the circuit board are arranged on a second imaginary plane (VS2) parallel to the first imaginary plane.

Sixth Aspect

In the inductive sensor according to any one of the first to fifth aspects, at least one of the multiple targets has a facing portion facing the transceiver coil, and the facing portion is provided with at least a conductor part of made of the conductor, and an insulator part that is the rest of the facing portion and is made of an insulator (26).

Seventh Aspect

In the inductive sensor according to the sixth aspect, the insulator forming a part of the targets is made of a resin, and the resin is used at a fixing portion (211, 221) where the part of the targets is fixed to the detection object.

Eighth Aspect

In the inductive sensor according to any one of the first to seventh aspects, the multiple targets include at least a first target (21) and a second target (22), and both the first target and the second target are fixed to the rotating body by a same bolt (75).

Ninth Aspect

The inductive sensor according to the eighth aspect further includes: a shaft (7) serving as the rotating body and being inserted into a first hole (214) of the first target and a second hole (224) of the second target; and an anti-rotation structure configured to restrict a relative rotation between the first target (21) and the shaft, and to restrict a relative rotation between the second target (22) and the shaft.

Tenth Aspect

In the inductive sensor according to any one of the first to seventh aspects, the multiple targets include at least a first target and a second target, and both of the first target and the second target are fixed to the rotating body by a caulking (701).

Eleventh Aspect

In the inductive sensor according to any one of the second to tenth aspects, a range in which the first transceiver coil is implemented on the circuit board is larger than a movable range of the first target movable in synchronization with the movement of the detection object on one and other sides of a moving direction, and a range in which the second transceiver coil is implemented on the circuit board is larger than a movable range of the second target movable in synchronization with the movement of the detection object on one and other sides of a moving direction.

Twelfth Aspect

In the inductive sensor according to any one of the second to eleventh aspects, the first target is larger than a range in which the first transceiver coil is implemented in the circuit board on both of a radial outside and a radial inside of a virtual circle perpendicular to the axis and centered on the axis, and the second target is larger than a range in which the second transceiver coil is implemented in the circuit board on both of the radial outside and the radial inside of the virtual circle.

Thirteenth Aspect

A brake pedal device is used for a brake-by-wire system (5) in which a brake mechanism (4) brakes a vehicle in accordance with a drive control of an electronic control device (3) mounted on the vehicle. The brake pedal device includes:
the inductive sensor (1) according to any one of claim 1;
a housing (6) as the fixed body that is directly or indirectly fixed to a vehicle body;
a shaft (7) as the rotating body, the shaft being rotatable within a predetermined angular range relative to the housing;
a brake pedal (8) as the movable body, the brake pedal being fixed to the shaft to be movable within a predetermined angular range about an axis (CL) of the shaft; and
a reaction force generating mechanism (9) configured to generate a reaction force against a pedaling force of a driver applied to the brake pedal.

Fourteenth Aspect

In the brake pedal device according to the thirteenth aspect, the brake pedal device is used for a complete brake-by-wire system in which components of the brake mechanism and the brake pedal are not mechanically connected, and the electronic control device drives and controls the brake mechanism based on an output signal of the inductive sensor to brake the vehicle.

Fifteenth Aspect

In the brake pedal device according to the thirteenth or fourteenth aspect, the multiple targets include at least a first target (21) and a second target (22), the first target is fixed to the shaft, and the second target is fixed to the brake pedal.

Sixteenth Aspect

In the brake pedal device according to any one of the thirteenth to fifteenth aspects, the multiple targets are fixed to the shaft. In addition, the brake pedal device further includes.
a torsion spring (41) provided to apply a load in a circumferential direction about the axis of the targets, to at least one of the multiple targets, and one end (42) of the torsion spring is engaged with at least one of the multiple targets, and an another end (43) of the torsion spring is engaged with the fixed body.

Seventeenth Aspect

In the brake pedal device according to the thirteenth or fourteenth aspect, the multiple targets include at least a first target (21) and a second target (22), and both of the first target and the second target are fixed to the shaft by using a same bolt (75).

Eighteenth Aspect

In the brake pedal device according to a seventeenth aspect, the shaft is inserted into a first hole (214) of the first target and a second hole (224) of the second target. In addition, the brake pedal device further includes an anti-rotation structure configured to restrict a relative rotation between the first target and the shaft and to restrict a relative rotation between the second target and the shaft.

Nineteenth Aspect

In the inductive sensor according to the thirteenth or fourteenth aspect,
  the multiple targets include at least a first target and a second target, and
  both of the first target and the second target are fixed to the shaft by a caulking (701).

Twentieth Aspect

In the brake pedal device according to any one of the thirteenth to nineteenth aspects,
  the multiple targets include at least a first target and a second target,
  the transceiver coil includes at least a first transceiver coil (31) that outputs a detection value corresponding to a position of the first target, and a second transceiver coil (32) that outputs a detection value corresponding to a position of the second target,
  a range in which the first transceiver coil is implemented on the circuit board is larger than a rotation range of the first target that rotates in synchronization with the shaft, on one and another sides in a rotation direction of the first target, and
  a range in which the second transceiver coil is implemented on the circuit board is larger than a rotation range of the second target that rotates in synchronization with the shaft, on one and another sides in a rotation direction of the second target.

Twenty-First Aspect

In the brake pedal device according to any one of the thirteenth to twentieth aspects,
  the multiple targets include at least a first target and a second target,
  the transceiver coil includes at least a first transceiver coil that outputs a detection value corresponding to a position of the first target, and a second transceiver coil that outputs a detection value corresponding to a position of the second target,
  the first target is larger than a range in which the first transceiver coil is implemented on the circuit board on both of a radial outside and a radial inside of a virtual circle perpendicular to the axis and centered on the axis, and
  the second target is larger on both a radial outside and a radial inside of the imaginary circle than an area in which the second transceiver coil is implemented on the circuit board.

What is claimed is:
  1. An inductive sensor for detecting a position of a detection object relative to a fixed body, the detection object either being (i) a rotating body rotatably provided about a predetermined axis relative to the fixed body or (ii) a movable body moving in accordance with a movement of the rotating body, the inductive sensor comprising:
  a circuit board fixed to the fixed body, the circuit board being implemented with a transceiver coil including a transmitter coil and a receiver coil, and a transceiver circuit that supplies a high frequency wave to the transmitter coil and outputs a signal corresponding to a change in inductance of the receiver coil; and
  multiple targets configured to include a conductor and to move in synchronization with a movement of the detection object, wherein
  the multiple targets include at least a first target and a second target actually-axially separated from the first target,
  the transceiver coil has at least (i) a first transceiver coil that outputs a detection value corresponding to a position of the first target, and (ii) a second transceiver coil that outputs a detection value corresponding to a position of the second target,
  a surface of the first target facing the first transceiver coil and a surface of the second target facing the second transceiver coil are arranged on a same surface at positions separated from the predetermined axis, the same surface being a first virtual plane, and
  the first transceiver coil and the second transceiver coil provided in the circuit board are arranged on a second virtual plane parallel to the first virtual plane.
  2. The inductive sensor according to claim 1, wherein the first target and the second target are fixed on the same rotating body.
  3. The inductive sensor according to claim 2, wherein the first target is fixed to the rotating body at a first position in an axial direction of the rotating body, the second target is fixed to the rotating body at a second position in the axial direction of the rotating body, and the second position is different from the first position in the axial direction of the rotating body.
  4. The inductive sensor according to claim 1, wherein at least one of the multiple targets has a facing portion facing the transceiver coil, and the facing portion is provided with at least a conductor part of made of the conductor, and an insulator part that is the rest of the facing portion and is made of an insulator.
  5. The inductive sensor according to claim 4, wherein the insulator forming a part of the targets is made of a resin, and the resin is used at a fixing portion where the part of the targets is fixed to the detection object.
  6. The inductive sensor according to claim 1, wherein both the first target and the second target are fixed to the rotating body by a same bolt.
  7. The inductive sensor according to claim 6, further comprising:
  a shaft serving as the rotating body and being inserted into a first hole of the first target and a second hole of the second target; and
  an anti-rotation structure configured to restrict a relative rotation between the first target and the shaft, and to restrict a relative rotation between the second target and the shaft.
  8. The inductive sensor according to claim 1, wherein both of the first target and the second target are fixed to the rotating body by a caulking.
  9. The inductive sensor according to claim 1, wherein a range in which the first transceiver coil is implemented on the circuit board is larger than a movable range of the first target movable in synchronization with the movement of the detection object on one and other sides of a moving direction, and a range in which the second transceiver coil is implemented on the circuit board is larger than a movable range of the second target movable in synchronization with the movement of the detection object on one and other sides of a moving direction.

10. The inductive sensor according to claim 1, wherein the first target is larger than a range in which the first transceiver coil is implemented in the circuit board on both of a radial outside and a radial inside of a virtual circle perpendicular to the axis and centered on the axis, and the second target is larger than a range in which the second transceiver coil is implemented in the circuit board on both of the radial outside and the radial inside of the virtual circle.

11. A brake pedal device used for a brake-by-wire system in which a brake mechanism brakes a vehicle in accordance with a drive control of an electronic control device mounted on the vehicle, the brake pedal device comprising:

the inductive sensor according to claim 1;

a housing as the fixed body that is directly or indirectly fixed to a vehicle body;

a shaft as the rotating body, the shaft being rotatable within a predetermined angular range relative to the housing;

a brake pedal as the movable body, the brake pedal being fixed to the shaft to be movable within a predetermined angular range about an axis of the shaft; and a reaction force generating mechanism configured to generate a reaction force against a pedaling force of a driver applied to the brake pedal.

12. The brake pedal device according to claim 11, wherein the brake pedal device is used for a complete brake-by-wire system in which components of the brake mechanism and the brake pedal are not mechanically connected, and the electronic control device drives and controls the brake mechanism based on an output signal of the inductive sensor to brake the vehicle.

13. The brake pedal device according to claim 11, wherein the multiple targets are fixed to the shaft, the brake pedal device further comprising a torsion spring provided to apply a load in a circumferential direction about the axis of the targets, to at least one of the multiple targets, and one end of the torsion spring is engaged with at least one of the multiple targets, and an another end of the torsion spring is engaged with the fixed body.

14. The brake pedal device according to claim 11, wherein both of the first target and the second target are fixed to the shaft by using a same bolt.

15. The brake pedal device according to claim 14, wherein the shaft is inserted into a first hole of the first target and a second hole of the second target, the brake pedal device further comprising an anti-rotation structure configured to restrict a relative rotation between the first target and the shaft and to restrict a relative rotation between the second target and the shaft.

16. The brake pedal device according to claim 11, wherein both of the first target and the second target are fixed to the shaft by a caulking.

17. The brake pedal device according to claim 11, wherein the transceiver coil includes at least a first transceiver coil that outputs a detection value corresponding to a position of the first target, and a second transceiver coil that outputs a detection value corresponding to a position of the second target, a range in which the first transceiver coil is implemented on the circuit board is larger than a rotation range of the first target that rotates in synchronization with the shaft, on one and another sides in a rotation direction of the first target, and a range in which the second transceiver coil is implemented on the circuit board is larger than a rotation range of the second target that rotates in synchronization with the shaft, on one and another sides in a rotation direction of the second target.

18. The brake pedal device according to claim 11, wherein the transceiver coil includes at least a first transceiver coil that outputs a detection value corresponding to a position of the first target, and a second transceiver coil that outputs a detection value corresponding to a position of the second target, the first target is larger than a range in which the first transceiver coil is implemented on the circuit board on both of a radial outside and a radial inside of a virtual circle perpendicular to the axis and centered on the axis, and the second target is larger on both a radial outside and a radial inside of the imaginary circle than an area in which the second transceiver coil is implemented on the circuit board.

19. The inductive sensor according to claim 1, wherein the rotating body is a shaft having a rod shape, and the first target and the second target are arranged around the shaft to have the same surface as the first virtual plane.

*    *    *    *    *